US007725472B2

(12) United States Patent
Uchiyama

(10) Patent No.: US 7,725,472 B2
(45) Date of Patent: May 25, 2010

(54) DISTRIBUTED MONITORING SYSTEM PROVIDING KNOWLEDGE SERVICES

(75) Inventor: Koki Uchiyama, Tokyo (JP)

(73) Assignee: Hottolink, Inc., Tokyo (JP)

( * ) Notice: Subject to any disclaimer, the term of this patent is extended or adjusted under 35 U.S.C. 154(b) by 472 days.

(21) Appl. No.: 09/870,581

(22) Filed: May 30, 2001

(65) Prior Publication Data
US 2002/0065802 A1   May 30, 2002

Related U.S. Application Data

(60) Provisional application No. 60/208,394, filed on May 30, 2000, provisional application No. 60/228,519, filed on Aug. 28, 2000.

(51) Int. Cl.
*G06F 17/30* (2006.01)
*G06F 15/173* (2006.01)
(52) U.S. Cl. ............... 707/758; 707/784; 707/999.003; 709/224
(58) Field of Classification Search ............. 707/1–102, 707/104.1, 200–201, 758, 784, 999.003; 709/203, 218, 219, 313, 223, 226; 715/526; 345/784, 781, 30; 705/8, 1
See application file for complete search history.

(56) References Cited

U.S. PATENT DOCUMENTS

| | | | |
|---|---|---|---|
| 5,793,964 A | | 8/1998 | Rogers et al. |
| 5,895,470 A | | 4/1999 | Pirolli et al. |
| 5,995,943 A | * | 11/1999 | Bull et al. ...................... 705/14 |
| 6,078,916 A | * | 6/2000 | Culliss ........................... 707/5 |
| 6,078,956 A | * | 6/2000 | Bryant et al. ................ 709/224 |
| 6,131,110 A | * | 10/2000 | Bates et al. ................. 709/203 |
| 6,185,614 B1 | * | 2/2001 | Cuomo et al. ............... 709/224 |
| 6,202,062 B1 | * | 3/2001 | Cameron et al. ............... 707/3 |

(Continued)

FOREIGN PATENT DOCUMENTS

EP   0 957 437 A2   11/1999

OTHER PUBLICATIONS

Langheinrich et al., "Unintrusive customization techniques for Web advertising," *Computer Networks*, Elsevier Science Publishers BV, Amsterdam, NL, vol. 31, No. 11-16, May 17, 1999, pp. 1259-1272.

*Primary Examiner*—Miranda Le
(74) *Attorney, Agent, or Firm*—Sughrue Mion, PLLC

(57) ABSTRACT

A de-centralized, or distributed, monitoring system provides for data collection across a broad range of remote sources, collecting explicit data (which may be input directly by a user in the form of recommendation, comment, or vote) and/or implicit data (which may be collected by the system according to the user's browsing activity). Data may be monitored locally at the client side, and subsequently transmitted to a central database. Data may be aggregated at the server, having been collected on the client side from multiple remote sources. During the aggregation process, data collected by the distributed monitoring system are categorized and organized in a central database for convenient retrieval. Implementation of the collected data includes both transmitting explicit data on demand as well as utilizing explicit data, implicit data, or a combination of both explicit and implicit data, in an open recommendation system which facilitates customization and personalization of the information retrieval process. A user may be provided with the option of turning off, or "deselecting," the implicit data collection functionality of the system.

20 Claims, 9 Drawing Sheets

U.S. PATENT DOCUMENTS

| | | | |
|---|---|---|---|
| 6,289,333 B1 * | 9/2001 | Jawahar et al. | 707/2 |
| 6,298,356 B1 * | 10/2001 | Jawahar et al. | 707/201 |
| 6,345,293 B1 * | 2/2002 | Chaddha | 709/219 |
| 6,353,822 B1 * | 3/2002 | Lieberman | 707/3 |
| 6,421,675 B1 * | 7/2002 | Ryan et al. | 707/100 |
| 6,446,076 B1 * | 9/2002 | Burkey et al. | 707/102 |
| 6,473,751 B1 * | 10/2002 | Nikolovska et al. | 707/3 |
| 6,489,968 B1 * | 12/2002 | Ortega et al. | 345/713 |
| 6,564,251 B2 * | 5/2003 | Katariya et al. | 709/214 |
| 6,567,797 B1 * | 5/2003 | Schuetze et al. | 707/2 |
| 6,701,362 B1 * | 3/2004 | Subramonian et al. | 709/224 |
| 6,757,661 B1 * | 6/2004 | Blaser et al. | 705/14 |
| 6,795,856 B1 * | 9/2004 | Bunch | 709/224 |
| 6,807,675 B1 * | 10/2004 | Maillard et al. | 725/35 |
| 6,832,218 B1 * | 12/2004 | Emens et al. | 707/3 |
| 6,836,799 B1 * | 12/2004 | Philyaw et al. | 709/224 |
| 6,839,680 B1 * | 1/2005 | Liu et al. | 705/10 |
| 7,003,792 B1 * | 2/2006 | Yuen | 725/46 |
| 7,072,888 B1 * | 7/2006 | Perkins | 707/5 |
| 7,080,064 B2 * | 7/2006 | Sundaresan | 707/3 |
| 2001/0018673 A1 * | 8/2001 | Goldband et al. | 705/27 |
| 2002/0002513 A1 * | 1/2002 | Chiasson | 705/27 |
| 2002/0035501 A1 * | 3/2002 | Handel et al. | 705/10 |
| 2003/0033298 A1 * | 2/2003 | Sundaresan | 707/5 |

* cited by examiner

DISTRIBUTED MONITORING SYSTEM PROVIDING KNOWLEDGE SERVICES

CROSS-REFERENCE TO RELATED APPLICATIONS

This application claims priority from U.S. Provisional Application No. 60/208,394, filed May 30, 2000, and U.S. Provisional Application No. 60/228,519, filed Aug. 28, 2000. The contents of both of these applications are incorporated herein by reference.

BACKGROUND OF THE INVENTION

1. Field of the Invention

The present invention relates generally to information retrieval from the Internet or other search spaces, and more particularly to a system of accumulating and organizing information collected from multiple remote locations in a central database, and implementing collected information in an open recommendation system.

2. Description of the Related Art

Presently, the nature and the structure of the Internet and other vast search spaces, combined with current technology and Internet exploration methodologies, present users with many problems for which current technology has offered no solutions. For instance, while an overwhelming amount of information is obtainable on the Internet, the available information content is limited only to materials accessible through Hypertext Markup Language (HTML). Furthermore, present methods of organizing and presenting the information which is available to users are inadequate.

While some sites on the World Wide Web, for example, may provide users limited access to trends or suggestions based upon other users' behavior at that particular site, there is currently no expansive system which provides one user with global access to feedback and other information offered by other users. Moreover, since the current state of the art neither recognizes nor accommodates personal preferences or biases, exploration of the search space is less interactive, and consequently less efficient and less productive, than it otherwise could be.

In the context of the World Wide Web, for example, the information presently available for users is limited to the HTML documents which make up the searchable hyperspace. While most users consider interaction with other users and recommendations by other users to comprise the most efficient mechanisms for identifying useful and relevant information, current systems employed for information organization and retrieval are not adapted for providing a centralized server through which convenient and unrestricted user access to input from other users is enabled.

Additionally, while many users turn to the Internet for information concerning other media types, for example, television and radio, these and other media which are not HTML based are completely neglected by the Internet navigation and information retrieval systems currently in use; that is, access to these various other media is not possible through current HTML navigation methods and systems. This inaccessibility or elimination of other media sources which are not based upon HTML documents from current search and navigation systems represents a significant limitation of the state of the art.

Moreover, where limited interactive functionality is provided by current technology, the interaction is typically restricted to information exchange between one user and the site host, i.e. a closed system, rather than expanded to include information exchange between the various users of the site in an open recommendation system. As a result, current systems provide search results which do not take into account the preferences of users of such a closed system.

There has been a continuing and growing need, therefore, for an open, or distributed, recommendation system and method for identifying and accessing the most relevant information from the Internet or other vast search spaces. Such an open recommendation system and method should be customized so as to take into account the preferences and biases of the individual navigating the search space. Furthermore, a truly integrated system should support access through HTML to a variety of other media which are not traditionally HTML based, such as television and radio, for example. Additionally, since human input is generally the most preferred source of information, an open recommendation system and method should be adapted to incorporate human input as data into a central database, to facilitate retrieval of that information, and to encourage human interaction.

SUMMARY OF THE INVENTION

The system and method of the present invention overcome the foregoing and other shortcomings of known methodologies by employing open recommendation technologies which utilize a distributed monitoring system to accumulate a vast open database of knowledge and information which incorporates human input as data. In the terminology of the invention, this open database is referred to in some places as an open knowledge base.

The present invention operates to collect both explicit data and implicit data using a de-centralized, or distributed, monitoring system which provides for data collection across a broad range of remote sources. Software may be installed at remote terminals for monitoring purposes; as a result, data may be monitored locally at the client side, and subsequently transmitted to a central database. Additionally, the system and method of the present invention provide for aggregation, at the server, of the data collected on the client side from multiple remote sources. During the aggregation process, data collected by the distributed monitoring system are categorized and organized in a central database for convenient retrieval.

Data may be collected on the client side as explicit data, which may be input directly by a user in the form of recommendation, comment, or vote, or as implicit data, which may be collected by the system according to the user's browsing activity; further, the system may collect both explicit data and implicit data concurrently or in combination. Implementation of the collected data includes both transmitting explicit data on demand as well as utilizing explicit data, implicit data, or a combination of both explicit and implicit data, in an open recommendation system which facilitates customization and personalization of the information retrieval process. According to one aspect of the present invention, a user may be provided with the option of turning off, or "deselecting," the implicit data collection functionality of the system.

The system and method of the present invention operate to gather and to collect human knowledge by monitoring users' activities on the client or browser side, rather than on the server side. Data collected on the client side relating to user behavior and preference may subsequently be mined, converted, and manipulated through statistical analysis at the server. Such data collected may include some or all of the following: the Universal Resource Locators (URLs) associated with the sites visited; duration of time spent at each site; keywords the user associates with each site; explicit comments input by the user relating to each site; user evaluation of each site via voting; acceptance or rejection of recommendations related to URLs or people; other users whose name cards were accessed and/or collected; the people whom the user contacted; and user ID.

Additional information may be obtained from the sites and URLs themselves, and other multimedia data may be obtained such as information related to television and radio broadcasts, people, MP3, and telephone numbers. As a user visits each site, relevant information is collected. The information collected may be categorized as either explicit or implicit; both types of data may be collected simultaneously. Implicit information includes the names of Web sites, in terms of URLs, while explicit information includes vote responses, comments, and preferences with respect to each Web site.

In contrast to the various technologies currently in use, the system and method embodied in the present invention may be characterized as distributed, or "open," since neither the nature nor the location of information is a barrier to data collection, aggregation, and subsequent implementation. As an example, the system and method described herein do not depend for their utility upon portal-type technologies which favor information offered by licensed content providers. Accordingly, the inventive system and method are adapted to collect and to aggregate data with respect to the entire search space; that is, since data is monitored at the client side and stored at a central server, the information available to be collected and utilized is not selectively limited by the operator of a portal site or other information content provider, but rather extends to any and every site which may be reachable from the client side.

Additionally, monitoring may not be limited to browser or other Internet tool technology, but rather may extend to other types of terminals such as radios, televisions, telephones and Personal Communication Systems (PCSs), Personal Digital Assistants (PDAs), video recorders, set top decoder boxes, and the like. These various other terminals may be suitably connected, such as via wire line or wireless technology which is known in the art, to an Internet capable terminal such as a personal computer equipped with a browser. Through appropriate hardware connections and software communications, the system may be adapted to monitor activity conducted on these other terminal types.

In this regard, the system and method of the present invention are adapted to integrate the HTML platform with other media, such as television, radio, newspaper, and people. Presently, HTML is the language of choice for Web design technology; consequently, users' access to information content is limited by Web browser convention, i.e. restricted to HTML documents or pages. While current browser software allows display of information in various media accessible through HTML, it is not possible to provide users with access to other media.

Conversely, the present invention not only provides access to other media which cannot be displayed by HTML, such as real television or radio broadcasting, for example, but also maintains database records of information, monitored at the client side, concerning these alternative media types; in this manner, multimedia data are searchable in the same manner as ordinary HTML information. Current technology allows a user to search for Web sites or URLs focused upon a particular topic, for example; in response, the search engine provides a list of URLs which are related to the topic of interest. The present invention, in addition to returning a list of relevant URLs or Web sites, is further adapted to provide a list of people, television programs or channels, radio broadcasting information, and the like, which is also related to the topic of interest.

Hyperlinks displayed on the HTML page may link the user directly to a particular television or radio program or other live broadcast, which may be presented to the user at a different terminal or device. Selecting such a link displayed on the HTML page activates software programming designed to interact with the other media beyond the scope of HTML. As noted above, the software code of the present invention, in conjunction with appropriate hardware connections, may control the content displayed or accessed through other types of terminals such as televisions, video recorders, and radios, for example.

The present invention utilizes browser-embedded software to enable client side monitoring of user activity. The embedded software may be adapted to provide such features as search engines, advertising, surveys, slot machines, and lotteries. Conventional browser software has an integrated feature which allows incorporation of the system's software. As noted above, the embedded software program code may provide the following: monitoring of user activity on the client side; search engine functionality; banner advertising which may be customized for user preferences; survey or voting functions; and lotteries.

Since the foregoing features are incorporated into the software code installed on a user's terminal at the client side, the features are operational irrespective of which URL is currently loaded into the user's browser. That is, the user need not visit a particular Web site, such as a search engine Web site, for example, in order to take advantage of the search engine feature embedded in the browser software. Since the search engine function is included in the browser embedded software which accesses the database maintained at the server, a user need not navigate to a traditional search engine site before initiating a search.

Enhanced banner advertising functionality is also provided. Conventional banner advertising methodologies, for example, are dependent upon data monitored on the server side; consequently, these systems can only customize advertising presented to a user while the user is visiting the particular site which performs the server side monitoring. By integrating the banner advertising feature into the browser embedded software, and through utilization of the data monitored on the client side and stored at the central server, the inventive system can present customized banner advertising to a user irrespective of the user's location in the search space.

Additionally, the browser embedded software is capable of communicating with various multimedia terminals, as discussed briefly above. Through software control of network hardware devices, the system software embedded in the browser enables data monitoring and collection from non-HTML based sources, as well as control of various multimedia terminals.

The present invention additionally provides an advanced search engine ranking and filtering method which takes advantage of monitored data and user voting history. The conventional search engine orders search results in accordance with one or more predetermined algorithms, for example, which may be based upon metatags or other metadata, the number of occurrences of a queried keyword, the location of that keyword within a document, or some combination of these factors. Consequently, the typical search engine provides the same results in the same order for every search based upon a given keyword; these results are based upon neither a measure of the real relevance of the various sites with respect to a given keyword nor users' evaluations of the information provided at those sites.

While there have been many attempts to provide better search results by improving existing search engines, there have been very few successful efforts. The inventive system and method enable more meaningful search results by utilizing implicit and explicit data recorded in the central database to refine searches based upon what is known about each site which may potentially be returned as a result of any given search. Access history and voting records, collected from all the users of the system, are utilized to evaluate and to rank potential search results. The results returned are more meaningful as a result. As the database grows, search results for the same query improve over time.

For example, the list of URLs returned by current search engine technologies often include dead links which are no longer operational or have not been updated for a very long time. The inventive strategy of using explicit and implicit monitored data to evaluate each URL eliminates the likelihood of dead links being returned as search results, since users are unlikely to provide a vote of approval for such sites, and consequently, fewer users are likely to visit such a site or to spend any significant amount of time there.

Whereas current search engines may erroneously assign a higher relative priority to links actually having less relevance with respect to a particular query, this limitation is overcome through examination of explicit data concerning each site; human input may be analyzed as a factor in the relevance determination, thereby making the assessment of relevance more reliable and the search results, in turn, more accurate.

Additionally, a personal or customized search engine may be based upon privately monitored data concerning each respective user of the system. This search functionality is similar to that discussed above; in accordance with this particular aspect of the present invention, however, individual data is applied for each user conducting a search. The system can, therefore, provide customized search results by utilizing user profile information collected for each respective individual. Accordingly, the search results for each individual user may be different, even if two users conduct a search using the same keyword, since each user profile is unique. Where a first user, interested in Toyota automobiles, for example, and a second user, favoring, say, Honda automobiles, each performs a search using the keyword "automobile," the system of the present invention ranks Toyota related sites higher for the first user and Honda related sites higher for the second user.

Such a search strategy reflects each person's profile data, and may be adapted to provide the search results in order of decreasing relevance with respect to each searching user's unique profile data. Once again, the more user information is available, the better the results over time for a given query. As the user's profile becomes more comprehensive, the system has more and better data which may be used to customize the search.

In this manner, user preferences may be considered as a driving factor in a search process, as in the automobile example above. While many Web-based search engines of conventional design attempt to order, or to rank, a list of URLs according to relevance with respect to a query term, for instance, current technology does not account for the preferences and habits of the individual user. The system and method of the present invention, on the other hand, create a unique experience for each individual user by employing data accumulated with respect to each particular user's preferences so as to rank search results in an order more customized to each user's personality and tastes.

According to another aspect of the present invention, a multimedia search engine utilizes and accesses various kinds of information via user or human input. Accordingly, search results may include itemized lists or information concerning people, television, video, MP3, and others, in addition to ordinary URL results. Since human knowledge is incorporated into the system and catalogued in a central database, information outside the realm of HTML, such as television, radio, MP3, and so forth, may be included. The references to these other media may be expressed in the HTML, and links may be provided for access thereto.

Through selection of a link representing a television program, for example, the corresponding television program may be displayed on a television connected to the system as discussed above. Further, if a user were to conduct a search using the title of a television program as a keyword query, for example, the search result may yield the names of people who share preferences and habits which are consistent with the theme of the television program. By following a link from one of the people returned as a search result, which link may be shown on the HTML page, the television program may be viewed on a television connected to the system.

In accordance with this aspect of the invention, a given search result may return many links to multimedia content beyond HTML. From one or more such links, there may be multiple levels of links emanating therefrom. That is, rather than just returning a link to a television program, or to a particular user's relevant personal information, the search results may return additional link levels to other users, other types of programming (not only television, but also MP3, or radio, or the like), and additional link levels beyond that. The result will be a tree of links. Thus, for example, a link to a particular television program may yield a link to other types of multimedia content, including references to individuals, their preferences, and the like. These links in turn may link to other types of multimedia information beyond HTML.

Another important aspect of the present invention involves an open site recommendation service. Explicit user input and implicit user data, derived from user behavior, may be monitored such that the preferences and biases of an individual user may be known and stored in a central database. These preferences and biases may subsequently be employed by the open recommendation system and method to personalize the process of information retrieval and to assist the user in making decisions concerning information which may be most desirable for a given user.

Since a vast array of data is stored at the central database concerning HTML pages, for example, the system may employ program code adapted to recommend certain sites which are consistent with data in an individual user's profile. Where the system makes recommendations or suggestions based upon information known about the various sites recorded in the database, as well as upon explicit and implicit data concerning the user's preferences, information location and retrieval may be more efficient for the user.

Importantly, the inventive recommendation functionality is enhanced by the client side monitoring aspect of the present invention; every Web site, URL, person, multimedia, or other type of information source which has been recorded in the central database may be recommended by the system. Whereas typical portal sites, for example, only recommend information owned or licensed by the portal operator, the present invention is not so limited, and can recommend sites or other information sources from anywhere in the search space, regardless of the location or ownership of that information. As such, in accordance with this aspect of the invention provides the function of what the inventor has termed a "knowledge service provider," or KSP. The information that is accumulated from the client side, of course, constitutes knowledge; making that knowledge available to users in various ways, including but not limited to recognition of the preferences of a given user and the offering, to that user, of relevant information related to those user preferences.

In accordance with still another aspect of the present invention, the system and method are adapted to offer recommended or suggested communication with particular people. Through efficient utilization of the implicit and explicit data collected for each user, the present invention allows one user to find other, compatible people to contact. This facilitates communication between users, and encourages information exchange on a large scale.

Conventional chat rooms, newsgroups, or Bulletin Board Services (BBS), all of which facilitate running dialogue among users, are deficient with respect to users' preferences, or "profiles." Importantly, any user profiles which are created at such locations are exclusively local, and users are enabled to communicate only with other users of that local system, i.e. these systems are inherently closed or concentrated. Users employing conventional technology must first search to find an appropriate site or forum in which to communicate; only then can users attempt to find other people with whom to correspond.

The present invention, in contrast, may employ both explicit and implicit data in users' profiles to connect users with common interests, similar personalities, or mutual friends, without the limitations inherent in current, closed systems. A user need not search for a forum or other chat site, for example, since the system itself provides the mechanisms for communication; other users and their explicit data are readily provided by the system, along with appropriate user profile data to facilitate selection of a person having similar interests. Since implicit data concerning, for example, favorite URLs or most commonly searched keywords, are incorporated into a user's profile, other users may be assured that the system's suggestions or recommendations concerning compatible people are accurate. This is another aspect of the "knowledge service provider" (KSP) feature of the invention.

Another feature of the invention follows on an earlier aspect of the invention, which collects good information content. According to this further aspect of the invention, a service is provided both to select and to recommend that good information content to users. This aspect of the invention removes the need to continue to collect necessary information content, and the need to keep the contents fresh. Those efforts are costly and time-consuming, and have not been terribly efficient. The just-mentioned needs are met by other aspects of the invention, and by Web site owners and Internet users, particularly those owners and users availing themselves of those other aspects of the invention.

Importantly, the system and method of the present invention are adapted to provide matching degree meters, or compatibility gauges, which indicate the degree of similarity between the user and the page or URL currently loaded in the user's browser, for example, or between the user and other members or users of the system. A graphical display or numerical indication may be provided to the user with respect to the degree of "matching" or similarity. Such degree may change as a result of various factors: for example, the content of a particular site may vary over time, or the information in the user's profile may change during ordinary and increasing use of the system. As noted above, matching information may include the matching degree between one user and other people making use of the system. Given an indication of the relative matching of information in various users' profiles, one user may select the link to the user having the most closely matched profile rather than selecting a different user whose preferences appear to be relatively incompatible.

The above-mentioned and other attendant advantages of the present invention will become more apparent upon a detailed examination of the preferred embodiments thereof with reference to the attached drawings, described below.

DETAILED DESCRIPTION OF THE PREFERRED EMBODIMENTS

Figure 1:
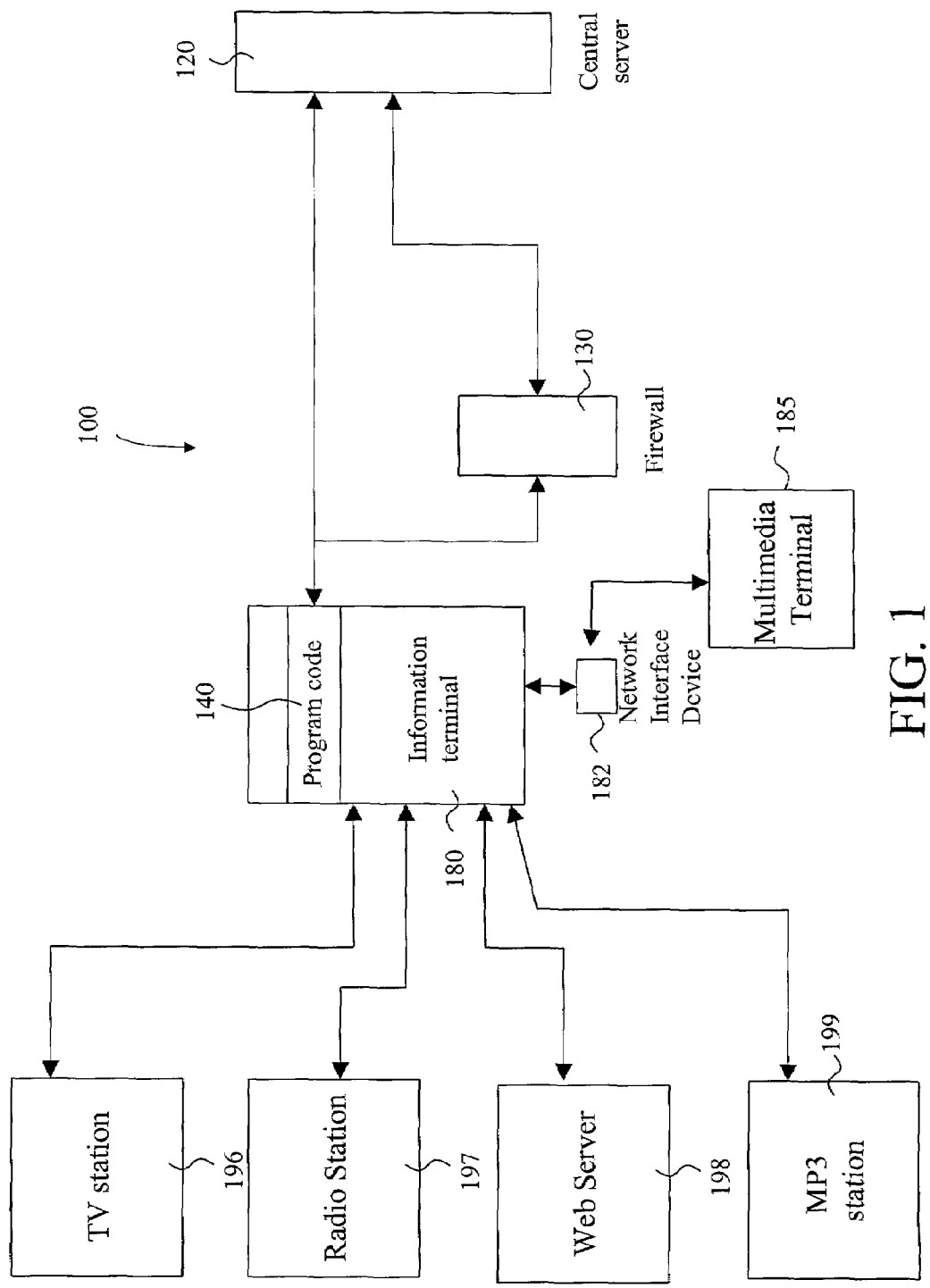
FIG. 1 is a simplified diagrammatic view of one embodiment of a system constituted in accordance with the present invention.

Turning now to the drawings, FIG. 1 is a simplified diagrammatic view of one embodiment of a system 100 generally constituted in accordance with the present invention. A central server 120 is provided with program code, such as JAVA® code, for example, or other suitable programming, which may be accessible from any Internet capable machine. A user at a remote location may have access to the Internet, and therefore to the central server 120, through a workstation, desktop, or portable notebook or laptop computer, for example, or through a wireless or handheld terminal, such as a portable Personal Communication System (PCS) or Personal Digital Assistant (PDA) device. Internet access may be through traditional land-line telephone connection, through higher bandwidth connections such as ISDN, DSL, T-1, T-3, coaxial, or fiber optic cables, or through cellular or wireless digital technology, for example, as is known in the art.

The program code at the central server 120 includes a central database for recording and categorizing information, and may be further adapted for communicating with additional program code 140 at a remote location, such as a user's computer terminal. The program code 140 may be transmitted or downloaded from the central server 120, for example, or installed onto the user's terminal from magnetic, optical, or other media. In the exemplary embodiment illustrated in FIG. 1, the program code 140 may interface with Internet navigation software, such as may be contained in information terminal 180; alternatively, the program code 140 may provide Internet navigation functionality.

It will be appreciated by those of skill in the art that typical browser software contained in information terminal 180 is customarily adapted to be modified by additional software, such as program code 140, which may both alter the Graphical User Interface (GUI) presented to the user by the browser software as well as provide additional functionality. The program code 140 may incorporate the following functions: "browser side," or "client side," monitoring of user browsing activity; search engine functionality; banner advertising, which may be customized or personalized according to monitored user preferences; survey or voting functions; and lottery, slot machine, or other types of games of chance.

The provision of advertising, or games, as part of the additional functions is well within the abilities of the ordinarily skilled artisan. The provision of advertising, per se, is known; however, it is within the contemplation of the invention to customize the advertising based upon user or group profiles and preferences, utilizing known types of statistical or weighted functions. Importantly, since the advertising function is integrated into the program code 140 at the client side and does not depend for its utility upon server side monitoring at a particular Web site, for example, targeted or customized advertising is not restricted by the particular URL which is currently loaded in the browser software 180.

Alteration of the GUI may be effectuated through insertion of a tool bar or other interactive interface, for example, which may include drop-down menus, operative buttons, and the like, through which the user may gain access to, and maintain control over, the capabilities of the system. In this regard, the program code 140 not only facilitates communication between the user's terminal and the central server 120, but also serves as the front end interface between a user and the system of the present invention.

In operation, the program code 140 at the user's terminal may be adapted to accept data input directly from the user, and also may monitor the activity of the browser software so as to collect information concerning that user's browsing behavior, habits, preferences, biases, and so forth. For example, when the user's browser software connects with or navigates to a particular Web site, such as one which may be maintained at Web server 198, the program code 140 may transmit information concerning that interaction from the user's computer terminal to the central server 120. Exemplary data which may be monitored in this embodiment may include the Universal Resource Locator (URL) of the Web site visited by the information terminal 180 via the browser software; URL information may be parsed out of the Hypertext Markup Language (HTML) code for the Web site. Keywords or query terms which the user submitted prior to navigating to the Web site, as well as the duration of the visit, may additionally be recorded.

As indicated in FIG. 1, data are monitored or collected at the user's terminal, or at the browser side, or client side. This data collection may be through direct input from the user or through the interface between the program code 140 and the browser software in information terminal 180. The program code 140, then, may transmit collected data to the central server 120 for recordation, categorization, and aggregation with data collected from other users. In the case where secure or private transmission is desired or required, transmission between the program code 140 at a remote terminal and the central server 120 may be through a firewall 130 or other security mechanism.

The information collected by the program code 140 at the remote terminal may generally be categorized as either implicit data or, alternatively, explicit data. In the case where the program code 140 is simply monitoring the user's browsing behavior as discussed above, for example by tracking URLs visited and the duration of each stay at a given site, the data collected are classified as implicit, since input is neither actively solicited from the user, nor received directly as a specific user action. A user may wish to deactivate the implicit data monitoring function. Explicit data, on the other hand, may be collected in the form of information input by the user through direct interaction with the program code 140. As an example, the user may select an operative button provided by the enhanced interface enabled by the program code 140, and such a selection may invoke a program script which allows the user to conduct a keyword search, for example, or to input written comments or opinions concerning the quality of the information provided at the site which the user is currently visiting. Alternatively or additionally, the program code 140 may enable the user to engage in ongoing dialogue with other users simultaneously visiting the site, or to post messages for other transient users. The user also may provide explicit data by casting a vote.

Implicit and explicit data may be collected concurrently or simultaneously. In one embodiment, data collected may include some or all of the following: URLs visited; duration of time spent at each site; keywords the user associates with each URL or site; explicit comments input by the user relating to each site; user evaluation of each site via voting; acceptance or rejection of recommendations related to URLs or people; data concerning other users whose name cards were accessed and/or collected; the people whom the user contacted; and user ID. Additional information may be obtained from the sites and URLs themselves, and other multimedia related data may be obtained, such as information related to television and radio broadcasts, people, MP3, addresses, telephone numbers, and the like. Thus, information terminal 180 may interact with TV station 196, radio station 197, and MP3 station 199, in addition to Web server 198 in known ways. For example, television signals, including the vertical blanking interval within such a signal, have sufficient capacity to contain information such as program title, program summary, identification of actors and actresses, and the like. Similar information (e.g. song titles, composers, performers, lyrics, and the like) may be contained in parts of radio signals or MP3 information. Such techniques are well within the abilities of the ordinarily skilled artisan, and so need not be detailed here. Such information also can be accessed as part of the identification of user preferences, and matching with other users and their preferences, as will be discussed in greater detail herein.

As a user visits various sites during browsing sessions, relevant information is collected at the client side and transmitted to the central server 120, where it may be stored in appropriate database records associated with the user, the URL or site itself, or both, as discussed below.

In one embodiment of such an information collection strategy, monitoring is done via the information terminal 180 using browser software or other Internet tools. The information terminal 180 is connected to various information sources, such as TV station 196, radio station 197, and MP3 station 199 in FIG. 1. The information terminal 180 in turn communicates with, or in some circumstances controls, a multimedia terminal 185. Such multimedia terminals may include a radio, a television, a telephone, a PCS, a PDA, a video recorder, a satellite or cable television receiver or set top decoder box, or other microprocessor based device capable of receiving and transmitting data. In this embodiment, the foregoing and various other types of multimedia terminals may be suitably connected, such as via wire, cable, power line, or wireless networking technology which is known in the art, to an Internet capable terminal such as information terminal 180 equipped with browser software modified with the system's client side program code 140. Through appropriate hardware connections and software communications, the system may be adapted to monitor activity conducted on these other terminal types. Jini (tm) code is well suited to enable links to activate appropriate devices. It is well within the abilities of the ordinarily skilled artisan to write appropriate implementing programs using Jini (tm). There also are other techniques, such as the I-mode of Nippon Telephone and Telegraph (NTT), in accordance with which a user can turn a television or radio on or off via signals from the user's cellular telephone.

For example, the program code 140 may include suitable routines for communicating with a network interface device 182, such as an infrared or radio frequency transceiver, a power line network adapter card, or other conventional network hardware known in the art, for interacting with a multimedia terminal 185. The program code 140 may receive and send data so as to monitor activity at one or more of the information sources 196-199. Information in the form of implicit data, such as television channels or radio stations to which the TV set or radio (as examples of a multimedia terminal 185) may be tuned, program titles and themes such as are provided for on screen display by cable or satellite programming providers, telephone numbers dialed, duration of activity, and the like may be transmitted from the multimedia terminals 185 through the network interface device 182 to the program code 140 at the information terminal 180. As with HTML data, the program code 140 may subsequently transmit the multimedia data collected in this manner to the central server 120 for classification, recordation, and aggregation. A user may wish to deactivate this implicit multimedia data monitoring function.

Software control of the network interface device 182 through program code 140 enables not only client side implicit data monitoring of user activity at one or more of the multimedia terminals 185, but also facilitates control of such multimedia terminals 185 from the information terminal 180. If a user selects an HTML link representing a television program, for example, the browser software in information terminal 180 may communicate that selection to the program code 140, which, in turn, may send data commands through the network interface device 182, activating a television set or other multimedia terminal 185 connected to the system and tuning the receiver to the appropriate channel, such that the television program is displayed on the television.

It should be noted that, while for ease of description network interface device 182 and multimedia terminal 185 are shown as separate from information terminal 180, it is within the contemplation of the invention to incorporate one or more types of multimedia terminal 185 into information terminal 180, as well as appropriate network interface devices 182.

Figure 2:
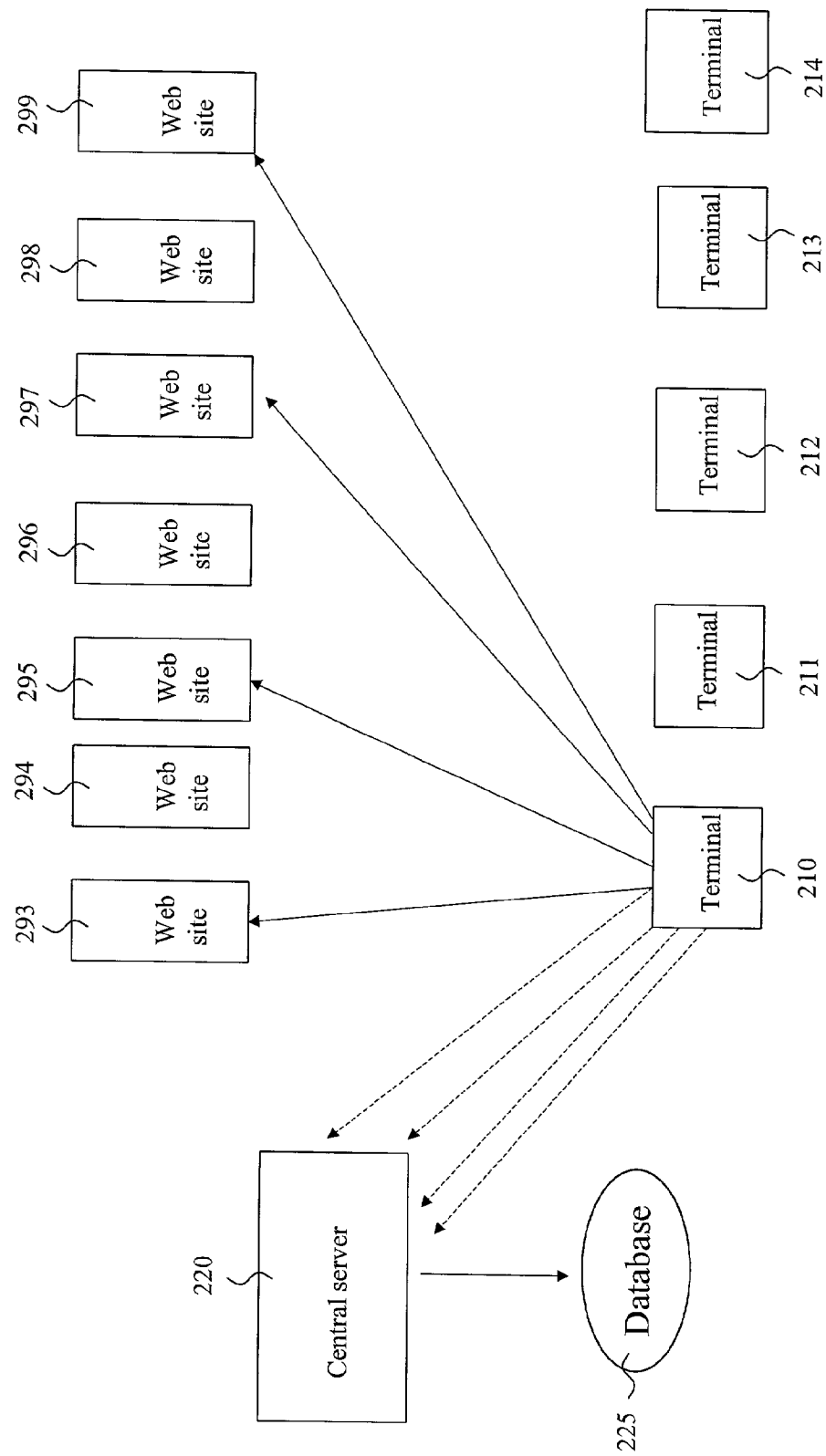
FIG. 2 is a simplified diagrammatic view of one embodiment of a distributed monitoring process employed by the present invention.

FIG. 2 is a simplified diagrammatic view of one embodiment of a distributed monitoring process employed by the present invention. The central server 220 in FIG. 2 represents the same central server 120 discussed above with reference to FIG. 1; additionally, the database 225 maintained at the central server 220 is further represented in the diagram. As noted above, user activity is monitored on the client side, as opposed to the server side; this client side monitoring scheme is distributed, or open, to the extent that the overall functionality of the monitoring system is not dependent upon the capabilities of individual sites or servers, nor is the utility of the information collected limited to a particular site.

Looking more closely at FIG. 2, for example, a plurality of Web sites are indicated as reference numerals 293-299; a plurality of users' Internet capable computer terminals, each of which may be at a different remote location, are designated as reference numerals 210-214. As indicated by the solid arrows in FIG. 2, a user at a remote terminal 210 may visit Web sites 293, 295, 297, and 299. One advantage of a distributed monitoring system as illustrated in FIG. 2 is that information concerning each visited Web site 293, 295, 297, and 299 may be transmitted, via the program code discussed above, from the remote terminal 210 to the central server 220, irrespective of whether or not local monitoring is supported at the Web sites 293-299 themselves; this transmission of data to the central server 220 is represented by the dashed arrows in FIG. 2. As discussed above, transmission of both implicit data, representing monitored user activity, and explicit data, representing user opinion, comment, recommendation, voting behavior, and the like, is supported.

The client side data monitored at the remote terminal 210 may be categorized and sorted by program code at the central server 220 and stored accordingly in the database 225. It will be appreciated that with increasing numbers of remote terminals 210-214 actively contributing to the distributed monitoring system, increasing amounts of information may be accumulated in the database 225 and may subsequently be available for retrieval.

Whereas the utility of the knowledge base accumulated on the server side at a specific site or company is limited to the server, site, or company where the data is monitored and collected, the strategy of monitoring user activity on the client side as the user browses from site to site enables the system illustrated in FIG. 2 to collect data from a multiplicity of sources and to implement accumulated data in locations other than where it was originally collected. The result is an open knowledge base, resulting from the inventive distributed monitoring system which monitors at the client side, rather than the server side.

Figure 3:
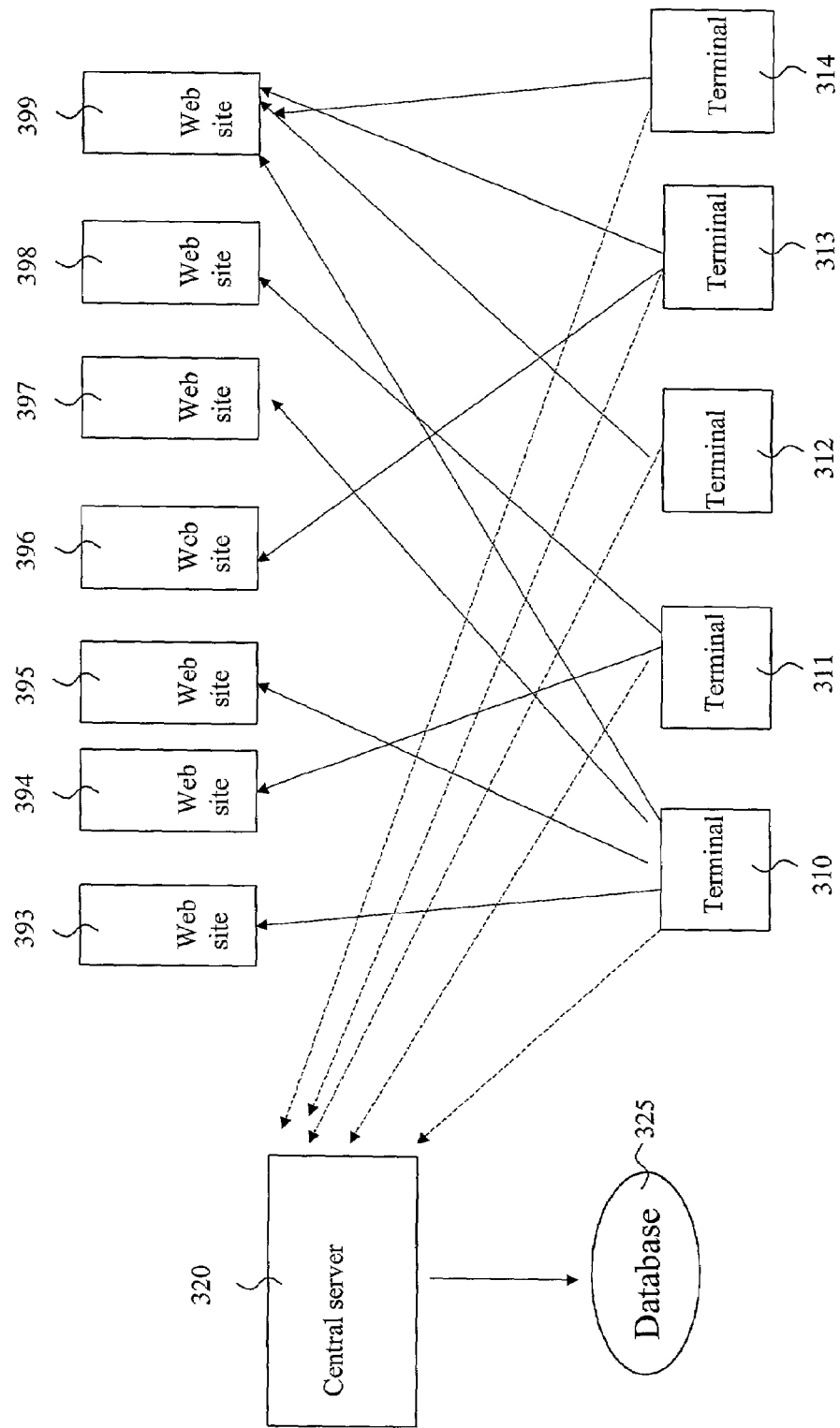
FIG. 3 is a simplified diagrammatic view of one embodiment of a data aggregation process employed by the present invention.

FIG. 3 is a simplified diagrammatic view of one embodiment of a data aggregation process employed by the present invention which may use a distributed monitoring scheme, such as the one illustrated in FIG. 2, for data acquisition from multiple remote sources. In contrast to the situation illustrated in FIG. 2, all of the remote terminals 310-314 are actively engaged in some sort of network activity, and the program code installed in each respective terminal 310-314 is monitoring the activity on the client side, irrespective of any local server side monitoring occurring at the respective Web sites 393-399. As indicated by the dashed arrows in FIG. 3, each remote terminal 310-314 may transmit, via the program code installed at each respective terminal, both implicit data concerning each of the Web sites 393-399 visited by a particular user, as well as explicit data concerning each respective user's feedback, comments, recommendations, voting behavior, and the like.

By way of contrast with FIG. 2, the situation illustrated in FIG. 3 involves all of the remote terminals 310-314 gathering data for recordation in the database 325. Accordingly, data which are ultimately categorized and stored in the database 325 are correspondingly more numerous. The central server 320 may be designed such that the database 325 has sufficient capacity for the number of users employing the system, and may be scalable to accommodate more traffic as the number of users expands.

Turning now to the structure of the database 325 itself, it is important to note that each respective user of the system may have an associated database record at the central server 320. In any given user record, a wide variety of information concerning that user's preferences and habits, i.e. a user profile, may be maintained. This recorded data may be accessed and utilized by the system to personalize each respective user's interactive experience, for example, through customized ranking of search results or through targeted site recommendations. Additionally, user profile data, and in particular, explicit data input by a user, may be made available to other users, such that users, as well as the knowledge and recommendations each has to offer, are recognized by the system as searchable information. The previously-mentioned open knowledge base thus constitutes the searchable information to which the system has access.

Further, statistical data may additionally be stored in the database 325. This statistical data may be considered universal, or "global," to the extent that it is not necessarily related to a single user's profile. Rather, statistical data may be related to the URLs most frequently visited by all the users on the system, keywords associated therewith, recent topics of interest, and the like. As will be appreciated from examination of FIG. 3, the system and method of the present invention are adapted to aggregate much more information than each of the individual Web sites 393-399, for example. Additionally, the explicit data input by each respective user are not merely limited to HTML technology, though such data may be accessible through HTML links. For example, a user may provide information related to television, radio, or video broadcasts, for example, which are not in HTML format; as a result, statistical data may be maintained independent of the HTML documents which are ordinarily searchable on the World Wide Web.

Figure 4:
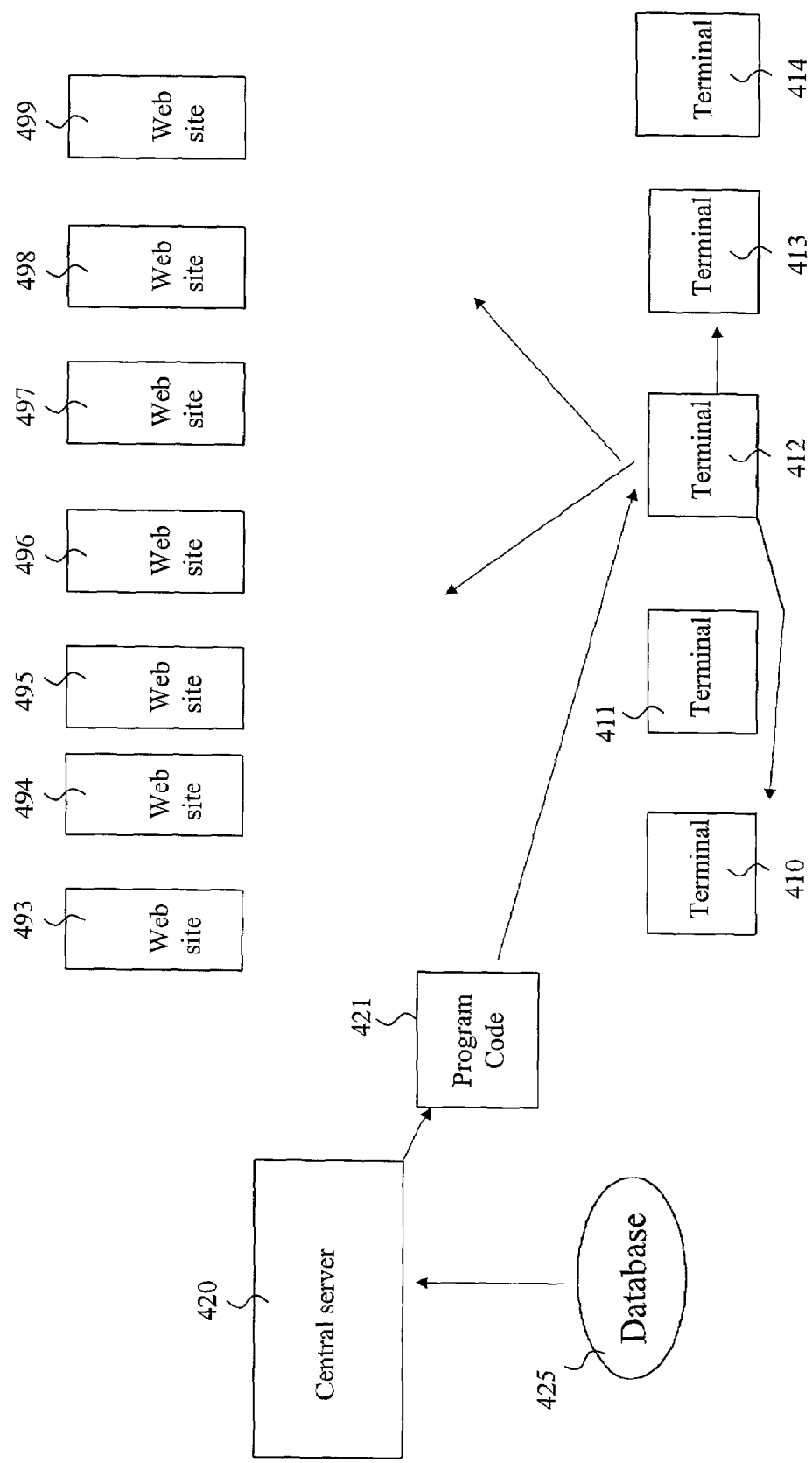
FIG. 4 is a simplified diagrammatic view of one embodiment of an open recommendation system and method of the present invention.

FIG. 4 is a simplified diagrammatic view of one embodiment of an open recommendation system and method of the present invention. As noted above, in addition to accumulating records in a database 425 maintained at a central server 420, the system and method of the present invention are adapted to implement recorded data in such a way as to customize otherwise impersonal aspects and features of Internet activity which are currently supported.

In contrast with the data collection and aggregation situations depicted in FIGS. 2 and 3, respectively, FIG. 4 illustrates that the direction of data flow is reversed during the data implementation, or open recommendation, process. Program code 421 maintained at the central server 420 may be adapted to communicate with various remote terminals such as those denoted by reference numerals 410-414. Responsive to a request from the program code installed at a remote terminal, such as terminal 412, the program code 421 may extract data from the database 425 on demand, manipulate the data according to the nature of the operation requested by the remote terminal 412, and subsequently transmit results of any data manipulation to the terminal 412.

As a result of the data manipulation, terminal 412 then may communicate with other terminals, such as terminal 410 or 413. Terminal 412 also may access Web sites, such as Web site 495 or 499. As discussed above with reference to FIG. 1, in response to information received from the program code 421 at the central server 420, the program code installed in terminal 412 may also communicate with a network interface device, which may operate to control a multimedia terminal such as a television, video or audio receiver or recording apparatus, and the like. This further communication is directed to assisting the user of terminal 412 in retrieving data, broadcasts, or other information consistent with the information in that user's profile.

In operation, the program code 421 serves to interface each remote terminal 410-414 connected to the central server 420 with the functionality of the system which, in turn, is enabled by the accumulation of the data records in the database 425. As noted above, the program code 421 may ultimately be responsive to a request from the program code installed at any of the remote terminals connected to the central server 420; accordingly, the functions performed by the program code 421 vary as described below.

Figure 5:
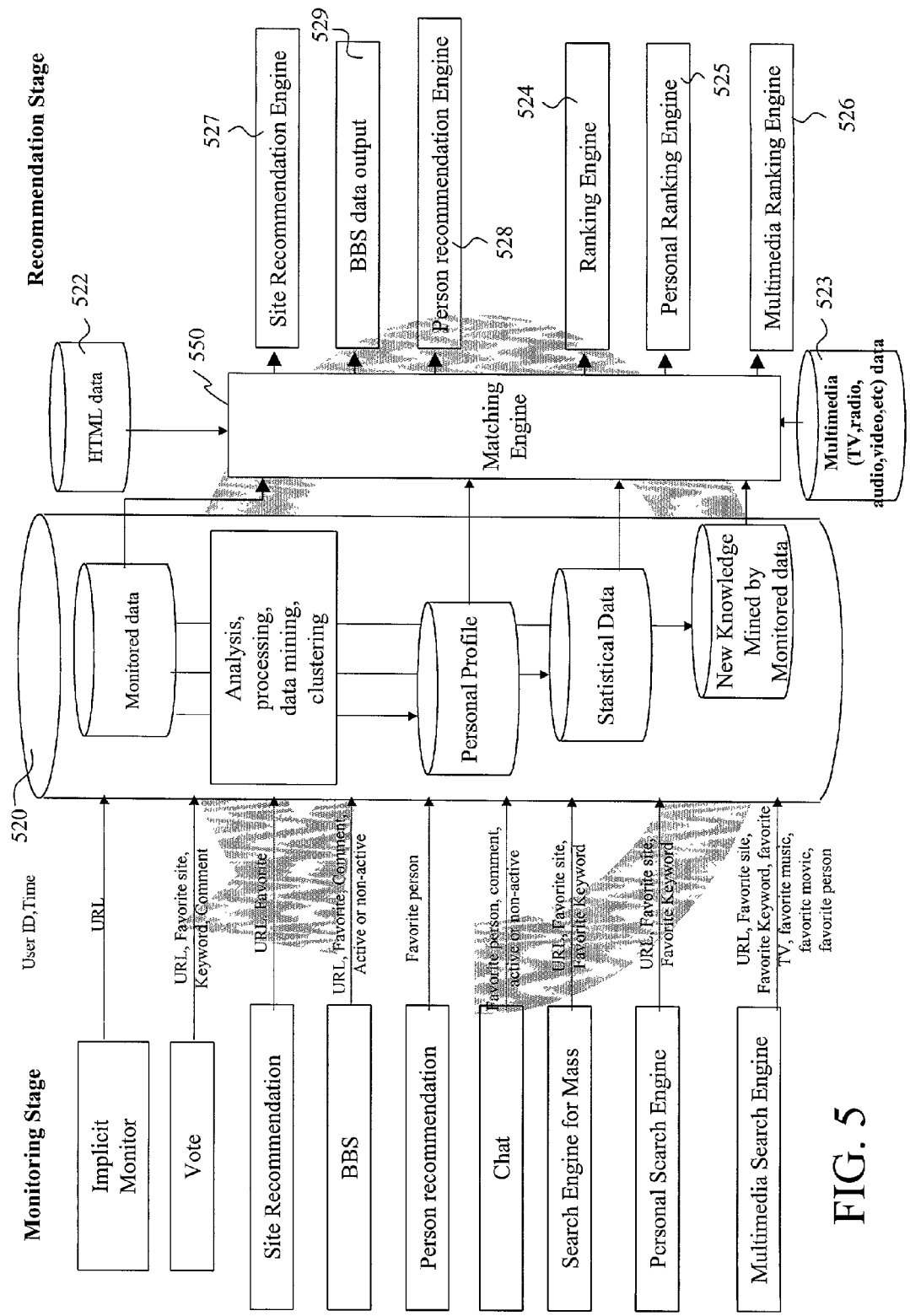
FIG. 5 is a general diagrammatic overview of the functionality of the system and method of the present invention.

FIG. 5 is a general diagrammatic overview of the functionality of the system and method of the present invention. The central server is designated as reference numeral 520 in the center of the figure, and may include database records for HTML data and multimedia data, represented by reference numerals 522 and 523, respectively. The items illustrated on the left side of FIG. 5 represent, by way of example, the nature of implicit data and explicit data which may be collected and aggregated as discussed above with reference to FIGS. 1 through 3. As illustrated in FIG. 5, data monitored at the client side may be aggregated, analyzed, and organized at the central server 520, and subsequently stored in appropriate records according to user profiles, statistical records, HTML data, multimedia data, and the like.

Matching engine 550 accepts input from HTML database 522 and multimedia database 523, as well as from central server 520, and categorizes user profiles and tastes as follows. A number of categories (for example, 100) may be created. For each category, there may be a set of words (for example, as many as 100) related thereto. For example, for "fashion," there might be words such as size, color, style, brand, gender, and the like that would be associated therewith. For "sports," words such as baseball, football, golf, hockey, and the like may be associated therewith.

Identification of appropriate key words for given categories may be carried out in various ways. One way would be to obtain, beforehand, a number of pages which would be relevant to a given category, and conduct lexical analysis to identify non-generic words that occur with some predetermined frequency within those pages. Those non-generic words then would be part of the overall list of key words.

By identifying categories and words associated with each category, there may be a concordance of, for example, 10,000 key words, occurrences of which the client side software will monitor as a user moves to various Web pages. There may be weighting associated with different key words, such that certain words, such as "baseball" may receive a different weighting within a sports category than something slightly more specific, such as "pitcher" or "catcher". This weighting may be static, i.e. predetermined, or may change depending on various considerations.

The weighting may be determined based on a list of user preferences provided beforehand. For example, if a user identifies sports as an area of interest, instances of the word "baseball" in Web pages that the user accesses may be given a higher weighting than in the case of a user who did not identify sports as an area of interest. As a specific example, someone interested in movie stars may access Web pages that talk about Marilyn Monroe, an actress who was married to Joe DiMaggio, a baseball player. The Marilyn Monroe reference may be weighted more heavily for that user than the reference to DiMaggio. On the other hand, a user may be interested in sports, and may access Web pages that talk about Joe DiMaggio, who was married to Marilyn Monroe. For that user, the DiMaggio reference may be weighted more heavily than the reference to Marilyn Monroe.

As the client side software identifies and counts up occurrences of ones of these key words, the database at the server side is updated for that particular user, and in this way, that user's preferences and desires are categorized to an ever-increasing level of detail.

With the user preferences thus identified through key word occurrences in accessed Web pages, it is possible to identify vectors, as it were, of user preferences. Those vectors, which can be weighted appropriately, then can be matched with vectors of other users, to identify users with similar interests.

Program code at the central server, such as the program code 421 discussed above with reference to FIG. 4, supports the recommendation functionality depicted on the right side of FIG. 5. While many ranking or sorting engines are known in the art, for example, current technology does not factor user profile data into the ranking procedure. It will be appreciated by those of skill in the art that programming scripts may compare user profile data with statistical data or information parsed directly from HTML code, for example, in order to assign a relative measure of compatibility to a particular site with respect to a particular user. Similarly, programming scripts may compare the respective data stored in two users' respective profiles and subsequently compute a relative measure of the compatibility of the users themselves.

In operation, user profile information, such as most commonly visited URL, most frequently submitted keyword, and the like, may be employed by the program code in the recommendation and ranking engines illustrated in FIG. 5. Output from the various recommendation and ranking engines may be transmitted to the program code installed at a remote terminal, which in turn, provides a display for a user. The display may be interfaced with the GUI provided by standard browser software code, as discussed above with reference to FIG. 1.

Regarding the exemplary capabilities of the system, designated generally by reference numerals 524-529 depicted on the right side of FIG. 5, the program code at both the central server and the user's remote terminal can provide many advanced features in a single, comprehensive system. For example, the present invention may provide access to a BBS-type service, such as illustrated at 529, enabling users to exchange text-based comments on various topics of interest. The system and method may additionally provide access to multimedia formats which cannot be displayed by HTML based browsers, such as television or radio broadcasting, for example. Hyperlinks displayed on the HTML page may be employed to link the user directly to a particular television program or other live broadcast. Selecting such a link displayed on the HTML page may activate one or more software programming scripts designed to interact with the other media beyond the scope of HTML.

Conveniently, for example, the system and method of the present invention may be adapted to provide an advanced search engine ranking and filtering function which takes advantage of monitored data and user voting history recorded at the central server for all users of the system. Such a ranking engine is designated as reference numeral 524. The conventional search engine is driven by predetermined algorithms based upon keyword frequency or metatags, and consequently provides search results, or "hits," which are based upon neither a measure of the real relevance of the various sites with respect to a given keyword nor users' evaluations of the information provided at those sites. The present system and method, on the other hand, enable more meaningful search results by utilizing the implicit and explicit data aggregated in the central database to refine searches.

According to one embodiment, statistical data concerning, for example, the number of users who have provided positive feedback and the keywords each user most frequently associates with a particular site, may be employed by the ranking and filtering engine 524; authoritative, popular, and relevant sites may be identified through such filtering, and ranked accordingly. Importantly, the information collected concerning sites is not limited to portal-type technologies, which favor information offered by licensed content providers. Since data is collected at the client side and aggregated at a central server, the information available to be recorded and subsequently implemented is not selectively limited by the operator of a portal site or other information content provider, but rather extends to any and every site which may be reachable from the client side.

Using explicit and implicit monitored data to evaluate each URL which is a potential search result eliminates the likelihood of dead links being returned as hits, since users are unlikely to provide a vote of approval for such sites, and consequently, fewer users are likely to visit such a site. By compiling data from registered users in the database within the central server 520, search results for any given query will improve over time; as more data is added to the database, dead links and irrelevant sites may be eliminated and the most relevant sites may be identified more easily. The improving results are in contrast to known search engines, which may provide more results as Web pages are added, but not better or otherwise different results.

Similarly, a personal or customized search engine 525 may be based upon privately monitored user profile data concerning each respective user of the system. Individual data, extracted from a specific user profile, for example, may be analyzed and compared with the foregoing statistical data for each user conducting a search. The system, therefore, may provide customized search results by utilizing user profile information collected for each respective individual and comparing that user profile data with the statistical data concerning a given potential search result. Each prospective search result may be weighted or ranked, for example, at least partially as a function of the comparison with the user profile data.

In the situation where two users conduct a search with the query term or keyword "automobile," for example, the two users may not have the same types of automobiles in mind. The first user may favor sports cars, and thus there may be data in the first user's profile concerning auto racing, driving schools, and a sports car driver's club; the second user, on the other hand, may favor sport utility vehicles, as evidenced by records in the second user's profile concerning 4-wheel drive vehicles and maps of the best places to drive a sport utility vehicle off-road. Given the identical keyword "automobile," the first user's search results may have sports car related hits ranked with higher relative priority or weight, while the second user's search results may have sport utility vehicle related hits ranked with higher relative priority. Such a search strategy reflects each person's individual profile data, and may provide the search results in order of decreasing relevance with respect to each searching user's unique profile data, for example.

As alluded to earlier, search results will improve as the user's profile becomes more comprehensive, and as more data is added to the database. For example, if the sports car enthusiast's preference for Ferraris becomes part of the profile, search results will tend to focus on those particular sports cars, or very expensive cars, or Italian sports cars.

As noted above, a multimedia search engine 526, utilizes and accesses various kinds of information provided via user or human input. Accordingly, search results, for example, may include itemized lists or information concerning people, television, video, MP3, and others, in addition to ordinary URL results. Where a data record exists in the database, for example, associating a television program's theme with a particular keyword, a search of that keyword will return any URLs which may be relevant as well as the television program record. Since human knowledge is incorporated into the system and catalogued in the central database 520, information outside the realm of HTML, such as television, radio, MP3, and so forth, may be recorded in the database 520 where implicit monitoring of a multimedia terminal has been conducted as discussed with reference to FIG. 1, or where one or more users have provided explicit data concerning a multimedia topic. The database 520 constitutes the open knowledge base which has been discussed above.

The references to these other media may be expressed in HTML, and links may be provided for access thereto. Through selection of a link representing a television program, for example, the corresponding television program may be displayed on a television connected to the system. Universal remote controls, for example, and other types of wireless or wire based networking devices or adapter cards, currently enable a single device to control various other terminals via infrared or radio frequency transmissions or other communication techniques. Where such a device is operatively coupled to a user's computer terminal and software controlled by the program code embedded in the user's Internet browser software, an HTML hyperlink may be used, for example, to tune a digital radio receiver, to program a video cassette recorder to record a particular television channel at a particular time, and so forth.

Further, since the system has access to explicit data input by users, various associations may be made, depending upon the nature of explicit data recorded. If a user were to conduct a search using the title of a television program as keyword query, for example, the search result may yield the names of people who share preferences and habits which are consistent with the theme of the television program. By following a link from one of the people returned as a search result, which link may be shown on the HTML page, the television program may be viewed on a television connected to the system. Again, as the wealth of information recorded in the database becomes more comprehensive, the more capable the system will become with respect to associating various users' profiles with data concerning multimedia topics.

The program code embodied in the present invention further may utilize both explicit user input and implicit user data, derived from user behavior, to categorize preferences and biases of an individual user and to store monitored information in a central database. Importantly, these preferences and biases may subsequently be employed by the open recommendation system and method to personalize the process of information retrieval and to assist the user in making decisions concerning information which may be most desirable for a given user. A targeted site referral system or recommendation engine, for example, may suggest particular URLs based upon known user tendencies and statistical data related to various sites.

Since a vast array of data is stored at the central database concerning HTML pages, for example, the system may employ the foregoing program code to recommend certain sites which are compatible with an individual user's profile. Such a site recommendation engine is designated as reference numeral 527. Where the system makes recommendations or suggestions based upon information known about the various sites recorded in the database, as well as upon explicit and implicit data concerning the user's preferences, information location and retrieval may be more efficient for the user.

Again, since the present invention utilizes a distributed monitoring system which collects data at the client side, the site recommendation engine 527 is not limited in scope to the few sites favored by a particular portal operator or accessible through conventional search engines, for example. The present site recommendation engine 527 may identify and suggest good content or compatible sites irrespective of location or domain; so long as the site is accessible from the client side, information concerning the site may be maintained in the database, and accordingly, the system may recommend the site to potentially interested users.

In addition to Web sites or other information sources which are likely to be of interest to a particular user, for example, the program code of the present system and method may be adapted to offer recommended or suggested people, as indicated at reference numeral 528, with whom a given user may be interested in communicating. Through efficient utilization of the implicit and explicit data collected for each user, the present invention allows one user to find other people to contact who have similar interests, as reflected in their respective user profiles. The program code may analyze user profiles, for example, and recognize which users have corresponding or similar interests, based upon implicit and explicit monitored data, thereby facilitating communication between users, and encouraging information exchange on a large scale.

Similar to the site recommendation engine 527 discussed above, the person recommendation engine 528 is not limited to the closed group of registered members of a particular newsgroup, chat room, or BBS, but rather may extend to the entire universe of people who have a profile on record in the system. Since detailed records, based upon data monitored on the client side, are maintained at the central server 520 concerning every user's profile, the system and method of the present invention may provide a user with a list of recommended or compatible people, notwithstanding the fact that they are not registered members of the same newsgroup as the user, for example.

Additionally, the system and method of the present invention are especially well adapted for indicating similarity or discrepancy between data contained in a particular user profile record and data related to various sites or to other users. For example, matching degree meters, or compatibility gauges, may be provided for displaying the degree of similarity between the user and a particular URL, or between the user and other members or users of the system. A graphical display or numerical indication may be provided to the user with respect to the degree of "matching" or similarity.

It will be appreciated that the degree of similarity between a user and a given site, for example, may change as a result of various factors: the content of a particular site may vary over time, for instance, or the information in the user's profile may change during ordinary and increasing use of the system. Additional matching information advantageously may include a measure of the relative compatibility of one user with respect to the other people making use of the system. Given an indication of the relative matching of information in various users' profiles, one user may select the link to the user having the most closely matched profile rather than selecting a different user whose preferences appear to be relatively incompatible.

Figure 6:
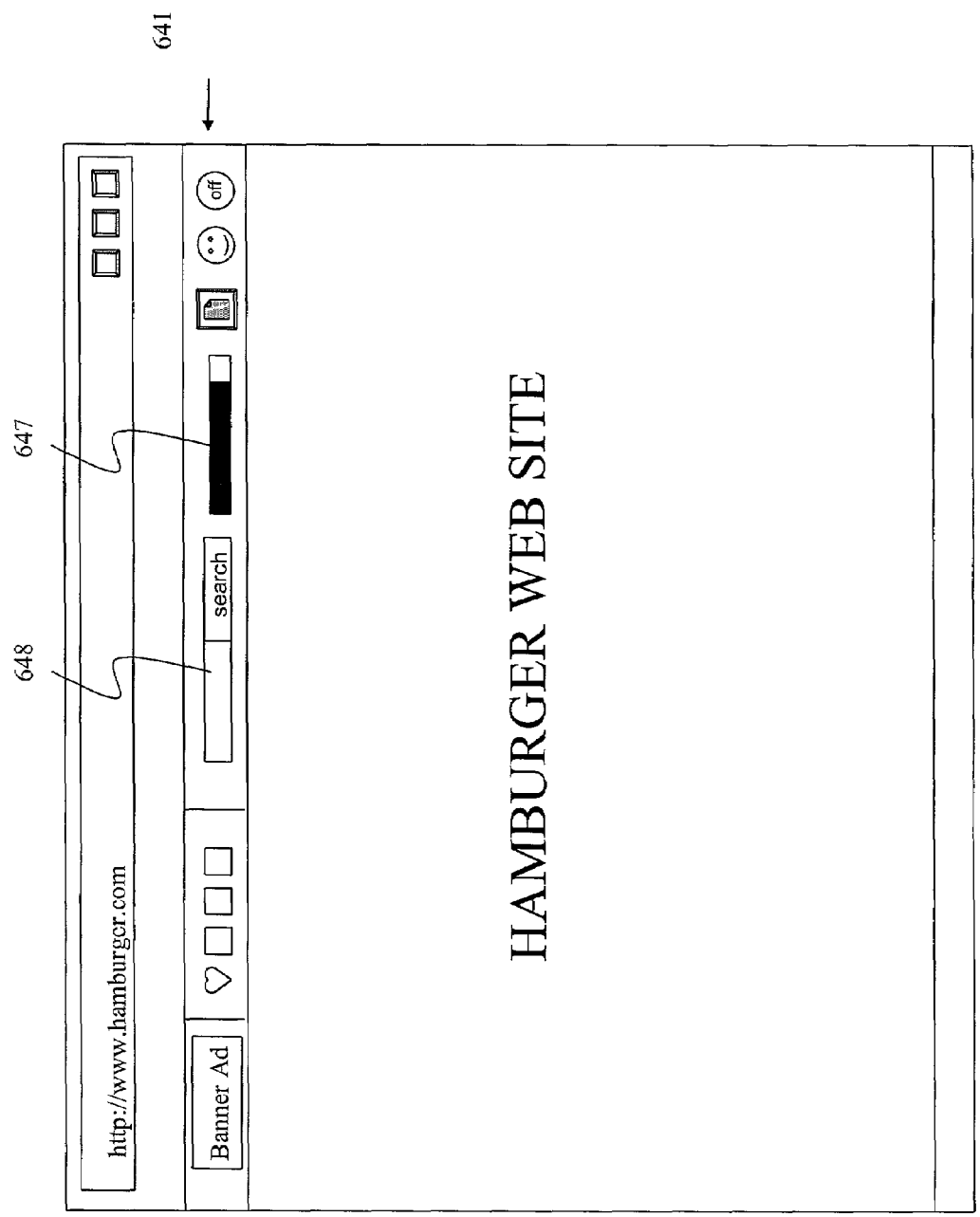
FIG. 6 is a representation of a Graphical User Interface employed by standard Web browser software which has been modified in accordance with the present invention.

FIG. 6 is a representation of the GUI employed by standard Web browser software, such as browser software 180 discussed above with reference to FIG. 1, which has been modified in accordance with the present invention. As discussed briefly above, the program code installed at a remote terminal may communicate with the central server as well as provide an interface through which the user may access the functionality of the system. The exemplary GUI depicted in FIG. 6 provides a convenient interface to the foregoing interactive functions described above with reference to FIG. 5. Upon installation at a remote server, the program code may take advantage of the interface mechanisms, or "hooks," in the standard browser code, and may install an additional frame in the GUI, such as the tool bar 641 in FIG. 6. As is known in the art, the tool bar 641 or other interface frame may contain operative buttons, drop-down menus, text entry boxes for initiating search features, and other GUI devices for accepting user input, as well as advertising banners and the like.

In one exemplary embodiment, the tool bar 641 may contain operative buttons or drop-down menus which provide access to explicit data entry scripts. Through selection of an item from a menu, for instance, the user may be presented with a text box or window into which comments, recommendations, and other information may be entered; additionally or alternatively, messages to other users may be posted in a manner similar to current newsgroup or BBS technology, or sent in real time. Any such explicit data provided may be recorded and aggregated at the central server for use by the system as described below.

Further, the tool bar 641 may include operative buttons which allow voting, for example, enabling a user to express positive or negative reviews of a particular Web site, person, current event, or other topic of interest. In FIG. 6, the voting button is signified by a heart in the tool bar 641. The tool bar 641 may also provide a text box 648 for accepting user keyword input for the search engine functionality of the system.

Taking user privacy concerns into consideration, the system and method of the present invention may be adapted selectively to be deactivated. To support such a feature, an operative button or other mechanism in the tool bar 641 may be provided so as to enable a user to turn off or otherwise to disable the implicit data collection functionality of the system. In FIG. 6, the deactivation function is signified by a button displaying the word "Off" in the tool bar 641.

In one embodiment, a "compatibility gauge" 647 may be provided in the tool bar 641 for providing a measure of the compatibility of the user profile data relative to the statistical data related to the site which is currently loaded in the browser software. A sliding scale, graph, or other type of meter may give the user a visual or numerical indication of how closely matched the statistical data related to the current site is to that data stored in the central database concerning the user's preferences. In FIG. 6, the relatively high level shown in the compatibility gauge 647 serves as an indication that the user's profile data is relatively consistent with the statistical data maintained at the central database related to "Hamburger Web Site." As the user browses from site to site, the level indicated by the compatibility gauge 647 changes as each successive page or site is loaded into the browser, such that a display of compatibility may be provided for a user in the tool bar 641 during ordinary browsing or searching activities.

Also, as discussed above with reference to FIG. 1, the program code incorporated into the system may enable the following functions in the tool bar 641: search engine features; banner advertising, which may be optimized or customized according to monitored user preferences; survey or voting functions, which facilitate explicit data input concerning Web sites, people, and so forth; and lotteries, slot machines, or other types of games of chance. It will be appreciated by those of skill in the art that incorporation of these features in the tool bar 641 may be accomplished through appropriate program scripts.

Figure 7:
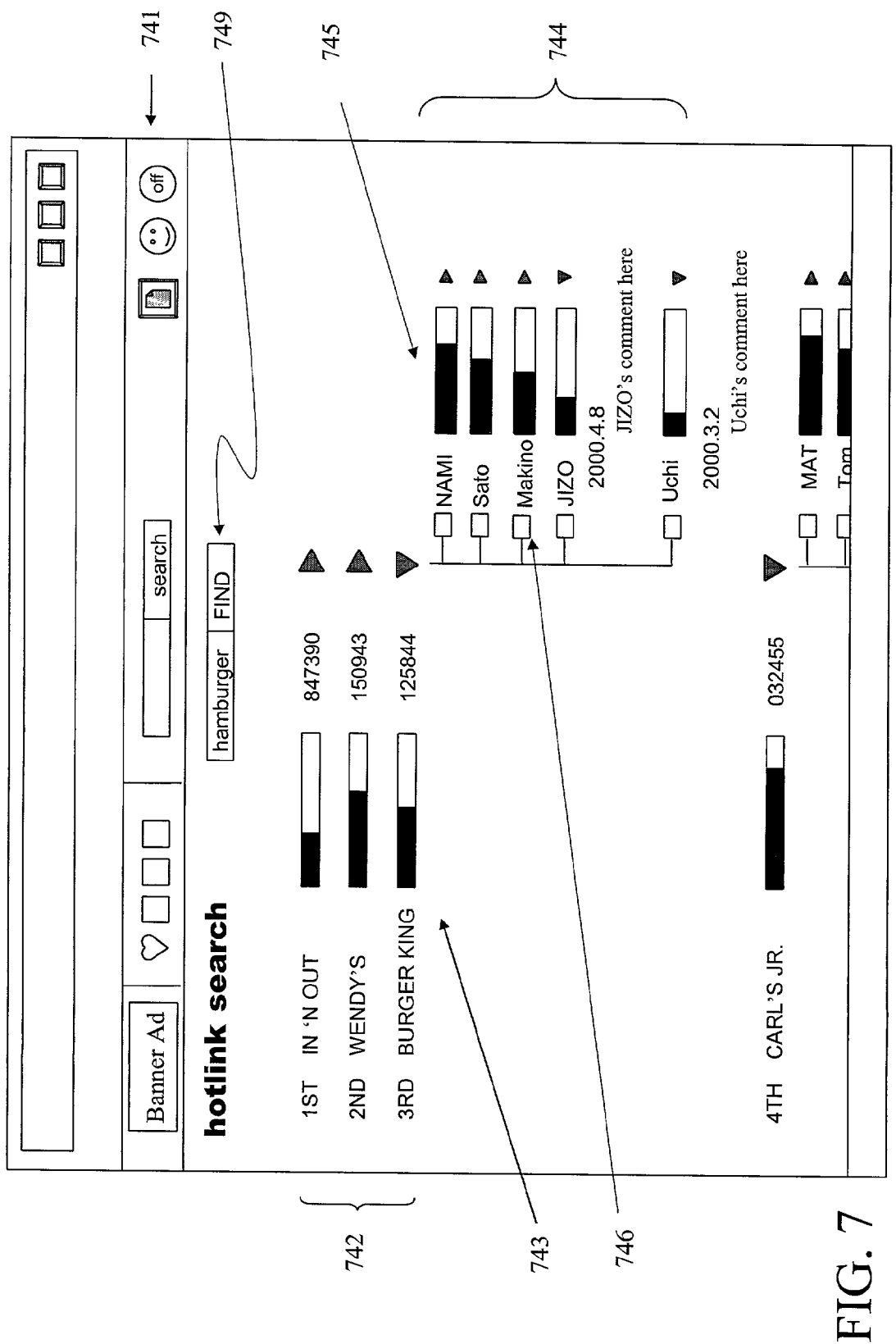
FIG. 7 is a representation of search results ordered in accordance with one aspect of the present invention.
Figure 8:
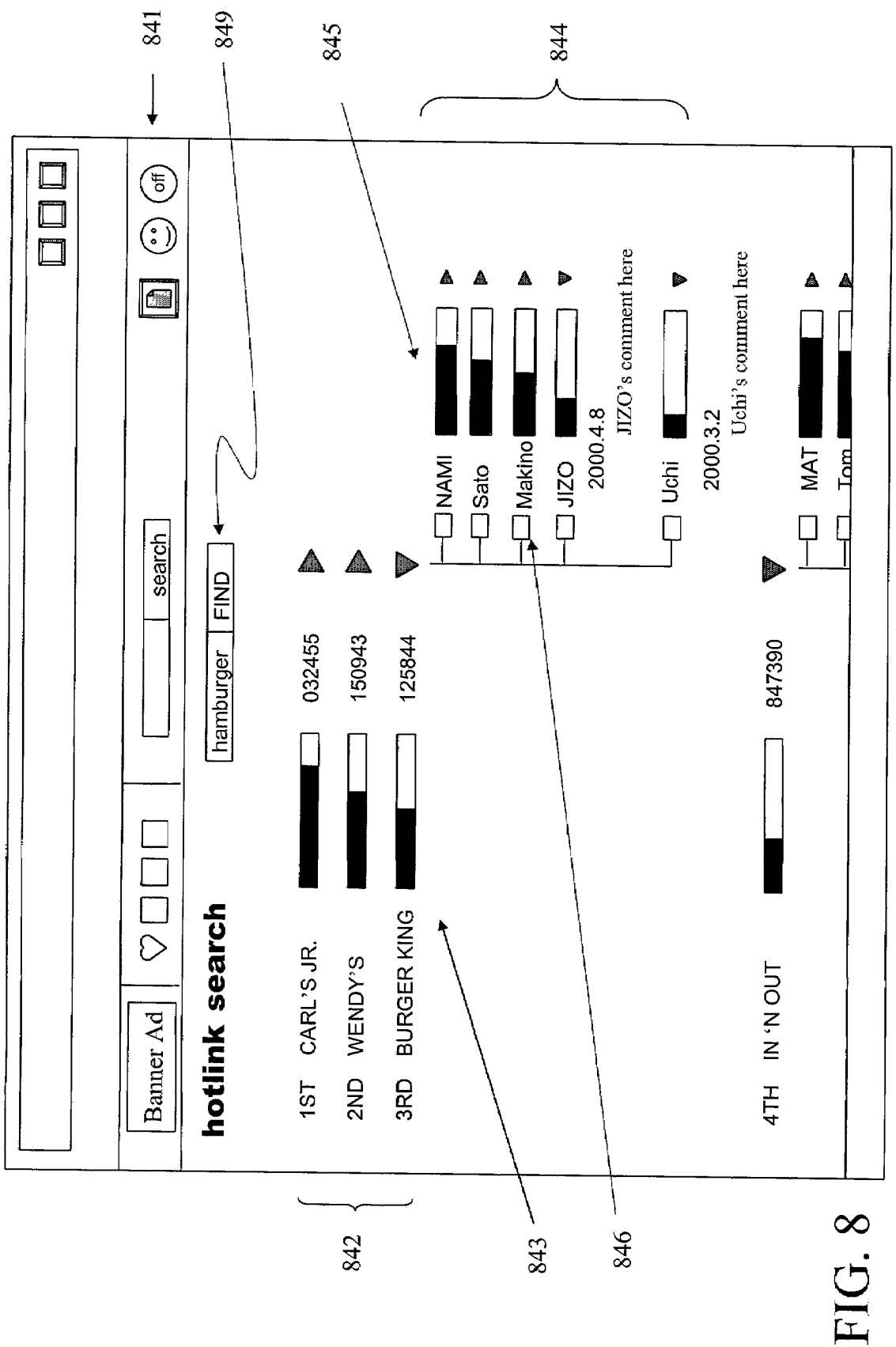
FIG. 8 is a representation of search results ordered in accordance with another aspect of the present invention.

FIGS. 7 and 8 are respective representations of search results ordered in accordance with different respective aspects of the present invention. The main browser windows in FIGS. 7 and 8 show examples of search results which have been obtained through the ranking engine 524 and the personal ranking engine 525, respectively, of the present invention. A keyword query may be entered at the text entry box 749 or 849, for example, which is provided by the HTML of the site currently loaded in the browser; alternatively, as discussed above with reference to FIG. 6, search engine program scripts may be accessed through a keyword query entered at a text entry box 648 provided in the tool bar 641. Responsive to such a keyword query or other search request, program code at the central server may orchestrate or oversee a database search for the query term.

The initial search may be conducted by program code at the central server, or it may be "out-sourced" to a large scale Web portal site or Web-based search engine. The results of such an initial search may be general, or standard, to the extent that the information retrieved may not be filtered or personalized for the particular user conducting the search. These initial results may subsequently be filtered through the ranking and filtering engine 524, either in isolation or in conjunction with the personal ranking engine 525, as discussed above.

The returned results may be ranked in accordance with the original, general search; alternatively, after filtering, for example through the ranking engine 524, the results may be ordered according to the number of users providing explicit data in the form of voting input with respect to each hit. The first three results, or hits, indicated by the bracket at the left side of the FIG. 7, are designated by reference numeral 742. In accordance with one aspect of the invention, the ranking is ordered in accordance with the number of votes each respective site has received from browsing users. Thus, the results in the illustrated example shown in FIG. 7 are ranked in order of voting users, with the number of voting users shown adjacent each respective hit and its corresponding compatibility gauge.

In the illustrated example shown in FIG. 7, where the user has input a query to find out information about "hamburger," the largest number of users indicated approval of In 'n Out Burger, and therefore this results is ranked first in FIG. 7. Wendy's was selected by the second largest number of users, and so this result is ranked second. Therefore, a user may find, or be led to the conclusion that, "In 'n Out" contains more relevant information than "Wendy's." In FIG. 7, as noted above, the order of hits is determined by the number of users providing explicit voting data for each respective search result; these results have not been subjected to the personal ranking engine 525 of the present invention.

As a consequence of relying on group voting preferences, the degrees of correlation between the user's preferences and the data concerning the various search results in the list have not been considered by the system prior to presentation of those results to the user. That this is the case can be seen in that, although "Carl's Jr." has received the fewest number of votes, thereby placing it at the bottom of the list of hits, the corresponding compatibility gauge indicates the highest degree of relative correlation between the user's preferences and the information available in "Carl's Jr." Therefore, the user may choose to navigate to "Carl's Jr." first, notwithstanding its relatively low placement in the ranking, based upon the compatibility gauge. It will be appreciated from examination of FIG. 7 that the ranking engine 524 may provide a user with both information concerning each hit's general relevance, reflected in the number of voters and the order of the hits, as well as information concerning the compatibility of the user's profile data with the information available at each site.

Additionally, in the case where the personal ranking engine 525 is employed, the search results may be presented in a personalized order according to a comparison of data concerning each hit and data contained in the user's profile. In the illustrated example shown in FIG. 8, where the user has input the same query to find out information about "hamburger," the largest number of users, again, indicated approval of In 'n Out Burger. Wendy's was selected by the second largest number, as in FIG. 7. In contrast to FIG. 7, however, the results in FIG. 8 have been manipulated by the personal ranking engine 525, such that user compatibility with the site affects the order in which the hits are returned. Though "Carl's Jr." received the fewest votes, the site is displayed as the first hit on the list, by virtue of its having the highest relative degree of compatibility with the user's profile data.

That is, upon completion of the initial search, the system of the present invention may employ programming adapted both to filter search results to provide meaningful search results in general, as well as to rank or to order search results according to the data maintained in each user's profile. According to one embodiment of the invention, statistical data related to each URL may be extracted from the database and implemented to organize search results according to the most popular, or most frequently visited, URLs. Such statistical data enables URLs to be examined in light of all the data accumulated by all of the users participating in the distributed monitoring system. This embodiment represents an improved, large scale search filtering engine for the masses, such as the ranking and filtering engine 524 in FIG. 5, exemplary results of which are displayed in FIG. 7. According to another embodiment of the present invention, programming code at the central server may extract database records both for the user conducting the search, i.e. user profile data, as well as for the URLs returned as results of the search, i.e. HTML data. This embodiment represents a unique, small scale, personalized search filtering engine, such as the personal ranking engine 525 in FIG. 5, designed to tailor search results accordingly to user preferences, as depicted in FIG. 8.

A comparison of the extracted database records may provide an indication that, for example, a particular HTML document contains, or may be related to, information which the user finds especially interesting. A high degree of correlation between extracted records may be interpreted by the system as compatibility between the user's interests and the site's contents; conversely, a low degree of correlation, or a discrepancy, between the user's preferences and the contents of the site may be interpreted by the system as incompatibility. The programming code at the central server may be adapted to perform such a compatibility analysis with respect to every URL loaded into the user's browser or returned as a hit in a search.

As noted above, the results of such a personalization of the rank or order of search results may be displayed to the user in a variety of ways. In FIGS. 7 and 8, each respective hit is displayed adjacent a respective compatibility gauge, such as the meter 743 or 843, for example, and a numerical indication of the number of users who have input votes concerning the hit. The levels indicated by the respective meters serve as a graphical display of the correlation of data in the user's profile and data concerning the corresponding search result as calculated by the personal ranking engine through the compatibility analysis discussed above, for example.

Alternatively, the program code at the server may be adapted to re-order the search results, such that those URLs which are most compatible with the user's profile data may be displayed higher in the list. In such an embodiment wherein the rank or order reflects compatibility with the user's preferences, a compatibility gauge, such as the meter 843, may not be required or desired, since the relative degree of compatibility with the user's profile data will be factored into the determination of the order in which the URLs are presented to the user, as in FIG. 8. Though relative degrees of matching are reflected in the rank of the hits in such an embodiment, compatibility gauges may be provided nevertheless, for displaying to the user an indication of the absolute degree of correlation between the user profile data and the HTML data.

As an example, a list of users, indicated by the bracket on the right side of FIGS. 7 and 8, and designated by reference numerals 744 and 844 respectively, has been ranked in decreasing order of compatibility with respect to the user conducting a search. The ranking may be determined by a similar programming procedure as the compatibility analysis discussed above with reference to HTML data; in this case, however, user profiles may be extracted from the database and examined for similarities and differences. The degree of correlation between user profile data may be interpreted by the programming code to relate directly to the compatibility of the two users whose data profiles are compared.

In this embodiment, though the order of the list of users 744 or 844 is indicative of relative compatibility with the user conducting a search, compatibility gauges, such as the meter 745 or 845, may be provided nevertheless, in order to provide the user conducting a search with an indication of absolute compatibility with respect to each other user who has previously commented on a particular site. In this way, the user conducting a search may make a judgment concerning the weight to be given to a particular vote, comment, criticism, or recommendation. The compatibility gauges thus may suggest to a user that linking to certain individuals (here, "NAMI") and accessing information via their name cards, etc., might be most productive.

As indicated by the tree structure in FIGS. 7 and 8, the list of users 744 or 844 may be an inclusive roster of people who have provided feedback, comments, or other explicit data related to the third hit in the list of URLs 742 or 842. Similar lists of users may be available for each hit returned in the search results. Such lists of users providing explicit data related to a particular URL may be selectively viewable. The system may be adapted to provide instant access to the explicit data provided by each respective listed user concerning the site in question; a user conducting a search may, therefore, obtain important information in the form of explicit user comments, votes, reviews, and advice, before navigating to a particular site. Importantly, this information has been provided by people who have previously visited the site, and who have strong enough opinions about the site to input thoughts and comments explicitly.

In addition to the meter 745 or 845 which serves as a visual indication of each listed user's compatibility with the searcher's profile, an operative button icon, such as that designated by reference numerals 746 and 846, may be associated with each listed user. Selection of the appropriate operative button icon 746 or 846 may provide the searcher with access to information related to the respective listed user. The program code at the user's terminal may invoke an additional window, for example, in which information concerning the listed user's e-mail address, profile data, favorite sites, comments, voting history, recommendations, and other explicit data may be available for review. Hyperlinks may be provided for convenient navigation to an e-mail server, for instance, or to recommended or highly favored URLs or multimedia functions.

Returning, now to the tool bar 641 and the contents thereof, it will be appreciated by those skilled in the art that various GUI programming methods may be employed to enable users to access a wide variety of system capabilities, such as those depicted on the right side of FIG. 5. Access to one or more BBS or newsgroup systems may be provided in the tool bar 641, for example, in the form of drop-down menus or operative buttons. By selecting such a service, users may gain access to text-based message windows, dialogue boxes, chat rooms for real-time communication, or the like. Users may post or transmit explicit data concerning any topic of interest as well as view other users' input. This functionality is supported by program code both at the central server as well as at the users' respective remote terminals.

Additionally, the tool bar 641 may provide an interactive element for invoking programming scripts which allow a user to offer explicit comments and feedback, or to vote positively or negatively, concerning the particular URL or site which is currently loaded in the user's browser. Such input may preferably be available to other users in the manner described above with reference to the list of users 744 or 844 who have previously visited a site. In this embodiment, selection of an operative button, for example, may invoke a text window for entering text comments. Such explicit data may be transmitted to the central server for recordation in a data record associated with the particular site; additionally, user profile data may be associated with the data record to enable the tree structure illustrated in FIGS. 7 and 8.

A personal recommendation function may also be accessed through the tool bar 641 shown in FIG. 6, for example. As noted above with respect to the compatibility analysis, data records in the database at the central server may be extracted for analysis and comparison with other records. In the same way that compatibility ratings may be computed during ordinary user activity, a user may independently invoke a separate compatibility engine, such as recommendation engines 527 and 528 in FIG. 5, adapted for providing recommendations with respect to Web sites, people, places, and so forth.

The program code at the user's terminal may accommodate a request for a list of other users who share an interest in a particular topic, for example. The programming scripts at the central server may analyze user profile records and provide a list of compatible users, or suggest a particularly popular Web site or newsgroup frequented by other users with similar interests. Similarly, the central server may employ code for recommending popular or authoritative Web sites related to a specific topic and compatible with the user's profile data; in conjunction with the suggested sites, the system may additionally provide a list of other users who favor the sites, along with their respective explicit comments.

Importantly, the system and method of the present invention are designed such that users' responses and reactions to the recommendation system may be monitored, and feedback may be encouraged; such monitoring results in the cyclic collection and aggregation of more and better implicit and explicit data. As a consequence, the system may develop an increasingly accurate and more complete profile of each user based upon implicit data monitored at the client side; additionally, the wealth of general knowledge and information accumulating in the records of explicit data may expand to provide increasingly more detailed and more useful reviews and recommendations concerning an expanding array of topics and people.

Figure 9:
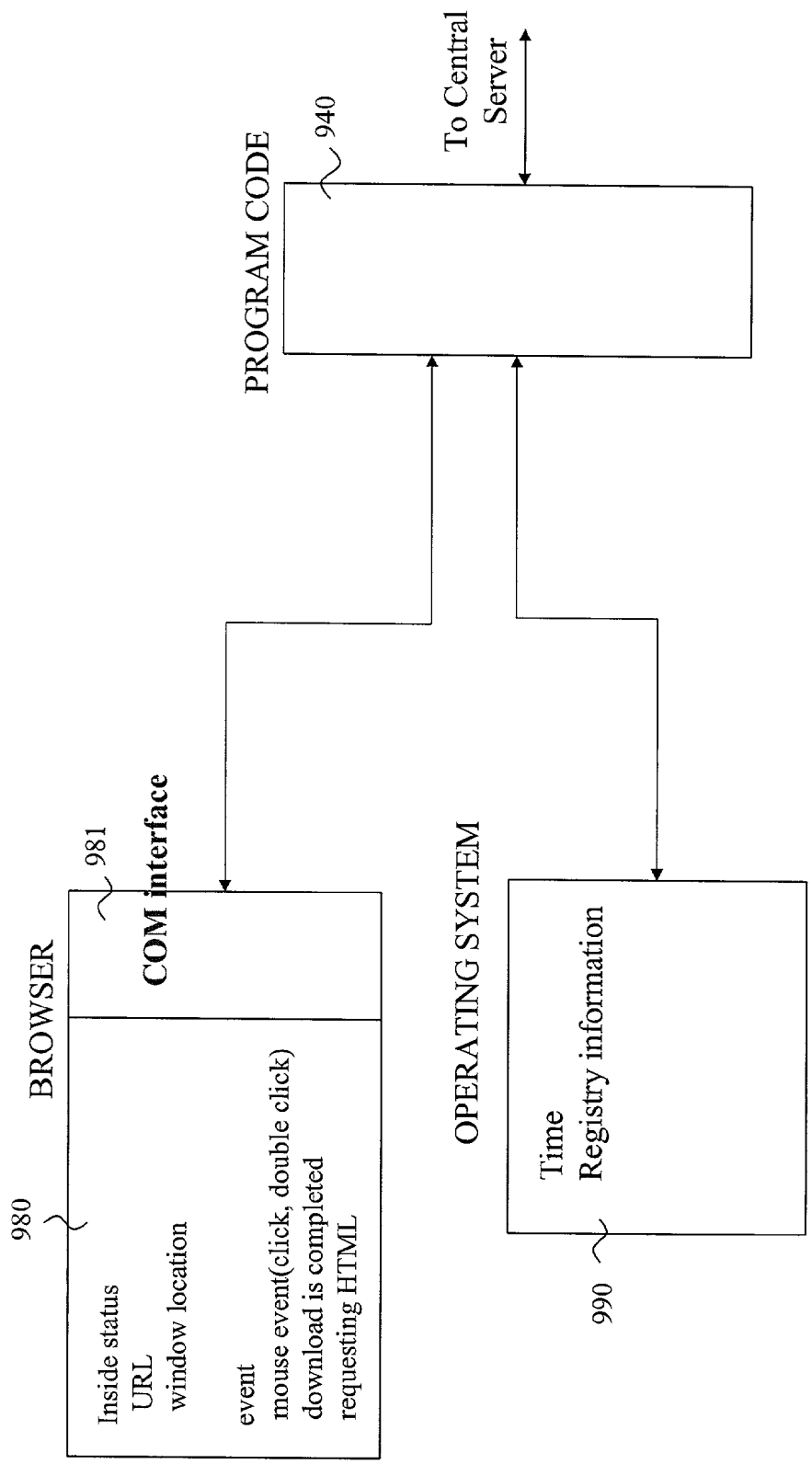
FIG. 9 is a simplified diagrammatic view of one embodiment of the distributed monitoring system of the present invention.

FIG. 9 is a simplified diagrammatic view of one embodiment of the distributed monitoring system of the present invention. As noted above with reference to FIG. 1, typical Web browser software 980 is customarily adapted to be modified by additional software, such as program code 940, which may both alter the GUI presented to the user by the browser software 980 as well as provide the foregoing additional functionality. In particular, as depicted in FIG. 9, the program code 940 interfaces with the browser software 980 and the operating system 990 of the remote terminal in order to enable the client side monitoring of user browsing activity discussed above.

In operation, the program code 940 at the user's terminal may be adapted to accept data input directly from the user, and also may monitor the activity of the browser software 980 through the appropriate code in the browser software 980, such as the COM interface 981. The COM interface 981 is a "hook" which permits a third party programmer to insert code which operates in conjunction with browser software 980.

Data from the browser software 980 which may be collected includes the following: the URL currently loaded; the location of the browser window in the remote terminal's display; and various browsing events such as GUI device selections, download completions, and URL requests. Through interface with the operating system 990 of the remote terminal, the program code 940 may be apprised of the duration of the visit to a particular URL. After the appropriate data is collected at the client side, the program code 940 may transmit collected data to the central server for recordation, categorization, and aggregation with data collected from other users, as discussed above.

From the foregoing, it can be seen that the system and method of the present invention provide versatile and personalized information retrieval functionality which addresses the nature of the search space and which is adapted for efficient user interaction. The preferred embodiments disclosed have been described and illustrated by way of example only, and not by way of limitation. Other modifications and variations to the invention will be apparent to those skilled in the art from the foregoing detailed disclosure. Thus, while only certain embodiments of the invention have been specifically described herein, it will be apparent that numerous modifications may be made thereto without departing from the spirit and scope of the invention.

What is claimed is:

1. A method of accumulating and retrieving information related to one or more information sources in a search space, said method comprising:

providing central program code at a central computer; said central program code being adapted for maintaining a central database of data records, for accessing the information related to said information sources stored in said central database, and for comparing said data records with said information related to said information sources;

recognizing communication between said central program code and remote program code at least one remote terminal; said remote program code being adapted for monitoring user activity of at least one user accessing any information source in the search space wherein the monitoring occurs irrespective of whether a uniform resource locator (URL) accessed in the search space is the same as the URL of said central program code, for collecting monitored data related to said user activity, and for transmitting said monitored data to said central program code, wherein said remote program code monitors and transmits said user activity without requiring said at least one user to access a search engine or any particular web site, and the monitoring and the transmitting is independent of the at least one user's access to any search engine, and further wherein the user does not need to access the search engine or the particular website for the monitoring to be performed;

supplementing, at said central computer, said data records in accordance with said monitored data to provide an augmented central database;

responsive to a request for information from said at least one user, identifying candidate response information related to said information sources at said central computer;

comparing contents of said augmented central database with said request and with said candidate response information at said central computer;

customizing information retrieval results for said at least one user based on said identifying and said comparing; and as a result of said identifying and said comparing, transmitting, to said remote program code at said at least one remote terminal, data concerning one or more of said information sources which contain information relevant to said request so as to progressively tailor said customized information retrieval results for said at least one user and provide said customized information retrieval results to said at least one user.

2. A method as claimed in claim 1, wherein said monitored data comprises implicit data, including data selected from the group consisting of queries and actions taken after receiving responses to said queries, said implicit data being added iteratively to said central database to form said augmented central database so as to progressively tailor information retrieval results for said at least one user based on said implicit data.

3. A method as claimed in claim 2, wherein said monitored data further comprises explicit data, including user input in response to one or more queries from said central computer, said user input including data selected from the group consisting of user profile information and user feedback concerning information retrieval results, said explicit data being added iteratively to said central database to form said augmented central database so as to progressively tailor information retrieval results for said at least one user based on said implicit data and said explicit data.

4. A method as claimed in claim 1, wherein said monitored data comprises explicit data, including user input in response to one or more queries from said central computer, said user input including data selected from the group consisting of user profile information and user feedback concerning information retrieval results, said explicit data being added iteratively to said central database to form said augmented central database so as to progressively tailor information retrieval results for said at least one user based on said explicit data.

5. A method as claimed in claim 1, wherein:
said remote program code is adapted for monitoring user activity of a plurality of users at a respective plurality of remote terminals, for collecting said monitored data related to said user activity and to one of said information sources accessed by each of said plurality of remote terminals, and for transmitting said monitored data to said central program code;

said supplementing comprises supplementing said data records based on said monitored user activity at said plurality of remote terminals to provide said augmented central database; and said transmitting to said remote program code comprises progressively tailoring said information retrieval results for said at least one user based on said user activity at said plurality of remote terminals.

6. A method as claimed in claim 5, wherein said monitored data includes a plurality of user profiles, and wherein said central computer groups contents of said augmented central database based on said plurality of user profiles so as to tailor said information retrieval results for said at least one user based on ones of said plurality of user profiles most closely matching a user profile of said at least one user.

7. A method as claimed in claim 6, wherein said information retrieval results include an identity of at least one other user with whom said at least one user then can communicate to obtain further information.

8. A method as claimed in claim 1, wherein said search space comprises the Internet, and media programming comprising at least one of television programming and radio programming, so that said at least one user can access said media programming as a result of said information retrieval results.

9. A method as claimed in claim 1, wherein said customizing comprises at least one of (a) ordering said information sources by utilizing monitored user information and comparing the monitored user information with statistical data for a search result, and (b) adding matching degree information based on at least one of said information sources and a user profile, and changing a search ranking based on a degree of matching.

10. A method as claimed in claim 1, wherein said customized results further comprise information identifying voting users who voted for at least one result of said customized results.

11. An information retrieval system for accumulation and retrieval of data related to one or more information sources in a search space, said system comprising:

remote program code at least one remote terminal; said remote program code being adapted for monitoring user activity of at least one user accessing any information source in the search space wherein the monitoring occurs irrespective of whether a uniform resource locator (URL) accessed in the search space is the same as the URL of said central program code, for collecting monitored data related to said user activity and to each of said information sources accessed by said at least one user, and for transmitting said monitored data, wherein said remote program code monitors and transmits said user activity without requiring said at least one user to access a search engine or any particular web site, and the monitoring and transmitting is independent of the at least one user's access to any search engine, and further wherein the user does not need to access the search engine or the particular website for the monitoring to be performed; and a central computer having central program code receiving said monitored data transmitted from said remote program code; said central program code being adapted for maintaining a central database of data records, for accessing information related to said information sources, and for comparing said data records with said information related to said information sources;

wherein said central program code supplements said data records in accordance with said monitored data to provide an augmented central database, said central computer identifying candidate response information related to said information sources in response to a request for information from said at least one user, comparing contents of said augmented central database with said request and with said candidate response information, customizing information retrieval results for said at least one user based on said identifying and said comparing, and transmitting, to said remote program code at said at least one remote terminal, data concerning one or more of said information sources which contain information relevant to said request so as to progressively tailor said customized information retrieval results for said at least one user and provide said customized information retrieval results to said at least one user.

12. A system as claimed in claim 11, wherein said monitored data comprises implicit data, including data selected from the group consisting of queries and actions taken after receiving responses to said queries, said implicit data being added iteratively to said central database to form said augmented central database so as to progressively tailor information retrieval results for said at least one user based on said implicit data.

13. A system as claimed in claim 12, wherein said monitored data further comprises explicit data, including user input in response to one or more queries from said central computer, said user input including data selected from the group consisting of user profile information and user feedback concerning information retrieval results, said explicit data being added iteratively to said central database to form said augmented central database so as to progressively tailor information retrieval results for said at least one user based on said implicit data and said explicit data.

14. A system as claimed in claim 11, wherein said monitored data comprises explicit data, including user input in response to one or more queries from said central computer, said user input including data selected from the group consisting of user profile information and user feedback concerning information retrieval results, said explicit data being added iteratively to said central database to form said augmented central database so as to progressively tailor information retrieval results for said at least one user based on said explicit data.

15. A system as claimed in claim 11, wherein:
said remote program code is adapted for monitoring user activity at a plurality of remote terminals, for collecting said monitored data related to said user activity and to one of said information sources accessed by each of said plurality of remote terminals, and for transmitting said monitored data to said central program code;
said central program code supplements said data records based on user activity at said plurality of remote terminals to provide said augmented central database; and
said central computer progressively tailors said information retrieval results for said at least one user based on said network activity at said plurality of remote terminals.

16. A system as claimed in claim 15, wherein said monitored data includes a plurality of user profiles, and wherein said central computer groups contents of said augmented central database based on said plurality of user profiles so as to tailor said information retrieval results for said at least one user based on ones of said plurality of user profiles most closely matching a user profile of said at least one user.

17. A system as claimed in claim 16, wherein said information retrieval results include an identity of at least one other user with whom said at least one user then can communicate to obtain further information.

18. A system as claimed in claim 11, wherein said search space comprises the Internet, and media programming comprising at least one of television programming and radio programming, so that said at least one user can access said media programming as a result of said information retrieval results.

19. A method of accumulating and retrieving information related to one or more information sources in a search space, said method comprising:
providing central program code at a central computer; said central program code being adapted for maintaining a central database of data records, for accessing the information related to said information sources, and for comparing said data records with said information related to said information sources;
recognizing communication between said central program code and remote program code at each of a plurality of remote terminals; said remote program code being adapted for monitoring user activity of each of a plurality of users accessing any information source in the search space wherein the monitoring occurs irrespective of whether a uniform resource locator (URL) accessed in the search space is the same as the URL of said central program code, for collecting monitored data related to said information retrieval activity, and for transmitting said monitored data to said central program code, wherein said remote program code monitors and transmits said user activity without requiring said plurality of users to access a search engine or any particular web site, and the monitoring and the transmitting is independent of the plurality of users' access to any search engine, and further wherein the user does not need to access the search engine or the particular website for the monitoring to be performed;
supplementing, at said central computer, said data records in accordance with said monitored data to provide an augmented central database;
responsive to a request for information from at least one user, identifying candidate response information related to said information sources at said central computer;
comparing contents of said augmented central database with said request and with said candidate response information at said central computer;
customizing information retrieval results for said at least one user based on said identifying and said comparing; and
as a result of said identifying and said comparing, transmitting, to said remote program code at least one of said plurality of remote terminals, data concerning one or more of said information sources which contain information relevant to said request so as to progressively tailor said customized information retrieval results for at least one user and provide said customized information retrieval results to said at least one user.

20. An information retrieval system for accumulation and retrieval of data related to one or more information sources in a search space, said system comprising:
remote program code at each of a plurality of remote terminals; said remote program code being adapted for monitoring user activity of a plurality of users accessing any information source in the search space wherein the monitoring occurs irrespective of whether a uniform resource locator (URL) accessed in the search space is the same as the URL of said central program code, for collecting monitored data related to said user activity and to each of said information sources accessed by said at least one user, and for transmitting said monitored data, wherein said remote program code monitors and transmits said user activity without requiring said plurality of users to access a search engine or any particular web site, and the monitoring and the transmitting is independent of the plurality of users' access to any search engine and further wherein the user does not need to access the search engine or the particular website for the monitoring to be performed; and
a central computer having central program code receiving said monitored data transmitted from said remote program code; said central program code being adapted for maintaining a central database of data records, for accessing information related to said information sources, and for comparing said data records with said information related to said information sources;

wherein said central program code supplements said data records in accordance with said monitored data to provide an augmented central database, said central computer identifying candidate response information related to said information sources in response to a request for information from said at least one user, comparing contents of said augmented central database with said request and with said candidate response information, customizing information retrieval results for said at least one user based on said identifying and said comparing, and transmitting, to said remote program code at least one of said plurality of remote terminals, data concerning one or more of said information sources which contain information relevant to said request so as to progressively tailor said customized information retrieval results for at least one user and provide said customized information retrieval results to said at least one user.

* * * * *